United States Patent
Kida et al.

(10) Patent No.: US 6,816,358 B2
(45) Date of Patent: Nov. 9, 2004

(54) CHIP-TYPE SOLID ELECTROLYTIC CAPACITOR HAVING A TERMINAL OF A UNIQUE SHAPE AND METHOD OF PRODUCING THE SAME

(75) Inventors: Fumio Kida, Toyama (JP); Shinji Arai, Toyama (JP); Takahiro Kayamori, Toyama (JP); Masao Hinazuru, Toyama (JP)

(73) Assignees: NEC TOKIN Corporation, Sendai (JP); NEC TOKIN Toyama, Ltd., Shimoniikawa-gun (JP)

( * ) Notice: Subject to any disclaimer, the term of this patent is extended or adjusted under 35 U.S.C. 154(b) by 0 days.

(21) Appl. No.: 10/812,766

(22) Filed: Mar. 29, 2004

(65) Prior Publication Data

US 2004/0201949 A1 Oct. 14, 2004

(30) Foreign Application Priority Data

Apr. 10, 2003 (JP) ........................................ 2003/106565
Jun. 16, 2003 (JP) ........................................ 2003/170429

(51) Int. Cl.[7] ........................... H01G 4/228; H01G 9/10; H01G 9/04
(52) U.S. Cl. ....................... 361/540; 361/538; 361/528; 29/25.03
(58) Field of Search ................................ 361/532–541, 361/528–529; 29/25.03

(56) References Cited

U.S. PATENT DOCUMENTS 6,343,004 B1 * 1/2002 Kuranuki et al. ........... 361/523
6,392,869 B2 * 5/2002 Shiraishi et al. ............ 361/523

FOREIGN PATENT DOCUMENTS

| JP | 6-168854 A | 6/1994 |
| JP | 7-240351 A | 9/1995 |
| JP | 2001-284192 A | 10/2001 |
| JP | 2002-164760 A | 6/2002 |

* cited by examiner

Primary Examiner—Eric Thomas
(74) Attorney, Agent, or Firm—Frishauf, Holtz, Goodman & Chick, P.C.

(57) ABSTRACT

A chip-type solid electrolytic capacitor having two capacitor elements using a valve metal and laminated in a direction perpendicular to a mounting surface to be mounted on a substrate. A pair of anode lead wires are extracted on one side from anode members of the capacitor elements in parallel to the mounting surface. The anode lead wires are connected to two branches of an anode terminal portion, respectively. A cathode terminal is connected to cathode layers on dielectric oxide films of the anode members. The solid electrolytic capacitor is encapsulated in an encapsulating resin with the anode terminal and the cathode terminal partially exposed. The branches of the anode terminal portion are configured so that they overlap each other by rotation of 180° around a center line.

18 Claims, 21 Drawing Sheets

CHIP-TYPE SOLID ELECTROLYTIC CAPACITOR HAVING A TERMINAL OF A UNIQUE SHAPE AND METHOD OF PRODUCING THE SAME

This application claims priority to prior Japanese applications JP 2003-106565 and 2003-170429, the disclosures of which are incorporated herein by reference.

BACKGROUND OF THE INVENTION

The present invention relates to a chip-type solid electrolytic capacitor and a method of producing the same.

An existing solid electrolytic capacitor using tantalum as a valve metal is small in size, large in capacitance, and excellent in frequency characteristic and is widely used, for example, in a power supply circuit of a CPU (Central Processing Unit).

In order to further improve the frequency characteristic, development is made of a solid electrolytic capacitor in which a conductive polymer is used as a cathode layer instead of manganese dioxide so that an equivalent series resistance (ESR) is improved and reduced to 1/10 or less.

However, as an operation frequency of the CPU becomes higher, there is an increasing demand for an improvement in noise characteristic of a power supply circuit for the CPU as well as an increase in allowable ripple current. As a consequence, a capacitor further lowered in ESR is required.

An apparatus to which the CPU is mounted is under development towards a small size and an advanced function. Accordingly, the solid electrolytic capacitor is required to simultaneously satisfy not only a lower ESR but also a small size, a large capacitance, and a thin profile.

Generally, if a plurality of capacitors are connected in parallel, a total capacitance $C_{total}$ and a total equivalent series resistance $ESR_{total}$ are given by:

$$C_{total} = C1 + C2 + \ldots + Cn \quad (1)$$

$$1/ESR_{total} = 1/ESR1 + 1/ESR2 + \ldots + 1/ESRn \quad (2)$$

where Ci and ESRi represent a capacitance and an equivalent series resistance of an i-th capacitor (i=1, 2, ..., n), respectively.

Therefore, if a plurality of capacitor elements can be connected in parallel within a limited space having a volume and a shape as desired, the capacitance will increased and the ESR will be decreased. This also applies to a case where the solid electrolytic capacitor is operated as a transmission-line noise filter.

The solid electrolytic capacitor comprising a plurality of capacitor elements connected in parallel is disclosed, for example, in Japanese Patent Application Publications No. H6-168854, H7-240351, and 2001-284192 which will hereinafter be referred to as Reference 1, Reference 2, and Reference 3, respectively.

Referring to FIG. 1, a multilayer solid electrolytic capacitor disclosed in Reference 1 includes a plurality of capacitor elements, an anode lead frame 271, a cathode terminal 272, a metal plate 273 with a protruding metal plate, and a reinforcing resin 274. Each of the capacitor elements comprises an anode metal foil 275, an insulator layer 276 formed at a predetermined position of the anode metal foil 275 to define an anode portion and a cathode portion, and a cathode member 277 formed in the cathode portion.

Referring to FIG. 2, an electrolytic capacitor disclosed in Reference 2 comprises a plurality of anode foils 281, a plurality of cathode foils 282, a plurality of cathode lead wires 282a, and an external anode terminal 285a, and an external cathode terminal 285b.

Referring to FIG. 3, a solid electrolytic capacitor disclosed in Reference 3 comprises an anode lead frame 290, a pair of unit capacitor elements 292a and 292b, a cathode lead frame 293, and a pair of anode lead wires 295.

In case where a plurality of capacitor elements are connected in parallel so as to achieve capacitor having a small size and a thin profile as well as a lower ESR and a high capacitance, there arise several problems in a connection structure between a plurality of anode lead wires and a plurality of anode terminals.

For example, in the example described in Reference 1, connection of the anode lead frame requires the metal plates different in shape and the reinforcing resin. It is therefore difficult to reduce the number of steps in a production process.

In the example described in Reference 2, a plurality of the anode lead wires are welded at welding portions on the same side of the anode terminal in close proximity to one another. Therefore, adjacent ones of the welding portions may interfere with each other, resulting in frequent occurrence of variation in connecting strength and in electric characteristics. Furthermore, it is not easy to sufficiently lower an electric resistance at a welding portion between each of the anode lead wires and the anode terminal.

In the example described in Reference 3, the anode lead wire must be processed by machining before it is welded to the anode lead frame. It is therefore difficult to increase the reliability of connection between the anode lead frame and the anode lead wire. In case where the anode lead wire is bonded by the use of a silver paste, it is not easy to lower the electric resistance.

Thus, in the conventional solid electrolytic capacitors, the reliability of connection and the electric characteristics tend to be varied as a result of an asymmetrical structure of the connecting portion between the anode lead wires and the anode terminal. It is therefore difficult to lower a production cost. Furthermore, if a plurality of welded portions are located on the same side of the anode terminal in close proximity to one another, adjacent ones of the welded portions interfere with each other. This results in easy occurrence of variation in connecting strength and in electric characteristics.

SUMMARY OF THE INVENTION

It is therefore an object of the present invention to provide a chip-type solid electrolytic capacitor which is low in ESR, high in capacitance, and excellent in reliability.

It is another object of the present invention to provide a method of producing a chip-type solid electrolytic capacitor mentioned above.

Other objects of the present invention will become clear as the description proceeds.

According to an aspect of the present invention, there is provided a chip-type solid electrolytic capacitor having a mounting surface and comprising a pair of capacitor elements laminated in a predetermined direction perpendicular to the mounting surface, each of the capacitor elements using a valve metal and having an anode member and a cathode layer mechanically coupled to the anode member, a pair of anode lead wires each of which is led out from the anode member in parallel to the mounding surface, an anode terminal connected to the anode lead wires, a cathode terminal connected to the cathode layer, and an encapsulating resin encapsulating the capacitor elements with the anode and the cathode terminals partially exposed, the anode terminal including two branches having branch end portions, respectively, which are formed by shaping, the branch end portions having shapes substantially same to each other so that the branch end portions overlap each other by rotation of 180° around a straight line at an intermediate position between the anode lead wires, the branch end portions being welded to the anode lead wires to produce welded portions, respectively.

According to another aspect of the present invention, there is provided a chip-type solid electrolytic capacitor having a mounting surface and comprising three capacitor elements laminated in a predetermined direction perpendicular to the mounting surface, each of the capacitor elements using a valve metal and having an anode member and a cathode layer mechanically coupled to the anode member, three anode lead wires each of which is led out from the anode member in parallel to the mounding surface, an anode terminal connected to the anode lead wires, a cathode terminal connected to the cathode layer, and an encapsulating resin encapsulating the capacitor elements with the anode and the cathode terminals partially exposed, the anode terminal including three branches having a first, a second, and a third branch end portion, respectively, which are formed by shaping, the first and the third branch end portions having shapes so as to overlap each other by rotation of 180° around a straight line, the second branch end portion being between the first and the third branch end portions, the first, the second, and the third branch end portions being welded to the anode lead wires to produce welded portions, respectively.

According to sill another aspect of the present invention, there is provided a chip-type solid electrolytic capacitor having a mounting surface and comprising four capacitor elements laminated in a predetermined direction perpendicular to the mounting surface, each of the capacitor elements using a valve metal and having an anode member and a cathode layer mechanically coupled to the anode member, four anode lead wires each of which is led out from the anode member in parallel to the mounding surface, an anode terminal connected to the anode lead wires, a cathode terminal connected to the cathode layer, and an encapsulating resin encapsulating the capacitor elements with the anode and the cathode terminals partially exposed, the anode terminal including four branches having a first, a second, a third, and a fourth branch end portion, respectively, which are formed by shaping, the first and the fourth branch end portions having shapes so as to overlap each other by rotation of 180° around a straight line, the second and the third branch end portions being between the first and the fourth branch end portions and having shapes so as to overlap each other by rotation of 180° around the straight line, the first, the second, the third, and the fourth branch end portions being welded to the anode lead wires to produce welded portions, respectively.

According to yet another aspect of the present invention, there is provided a method of producing a chip-type solid electrolytic capacitor having a mounding surface and comprising a plurality of capacitor elements which are laminated in a direction perpendicular to the mounting surface and electrically connected in parallel, each of the capacitor elements having an anode member using a valve metal, an anode lead wire led out from the anode member, and a cathode layer mechanically coupled to the anode member. The method comprises the steps of preparing a lead frame having an anode terminal forming portion and a cathode terminal forming portion, the anode terminal having a center line and a plurality of branches symmetrical with each other with respect to the center line, shaping the branches by bending, welding the capacitor elements to the anode terminal forming portion and connecting the cathode layer to the cathode terminal forming portion, molding the capacitor elements, connected to the lead frame, by an encapsulating resin to obtain a molded body, and cutting the lead frame to separate a part of the lead frame from the molded body.

According to a further aspect of the present invention, there is provided a chip-type solid electrolytic capacitor having a mounting surface and comprising a capacitor portion having a plurality of capacitor elements laminated in a predetermined direction perpendicular to the mounting surface, each of the capacitor elements using a valve metal, a cathode terminal led out from the capacitor portion, a plurality of anode lead wires led out from the capacitor portion in parallel to the mounting surface, the anode lead wires being positioned apart from each other in the predetermined direction, an anode terminal connected to the anode lead wires; and an encapsulating resin encapsulating the capacitor portion with the anode and the cathode terminals partially exposed, the anode terminal including a plurality of branch end portions which are positioned apart from each other in the predetermined direction and welded to the anode lead wires, respectively.

DESCRIPTION OF THE PREFERRED EMBODIMENTS

Figure 1:
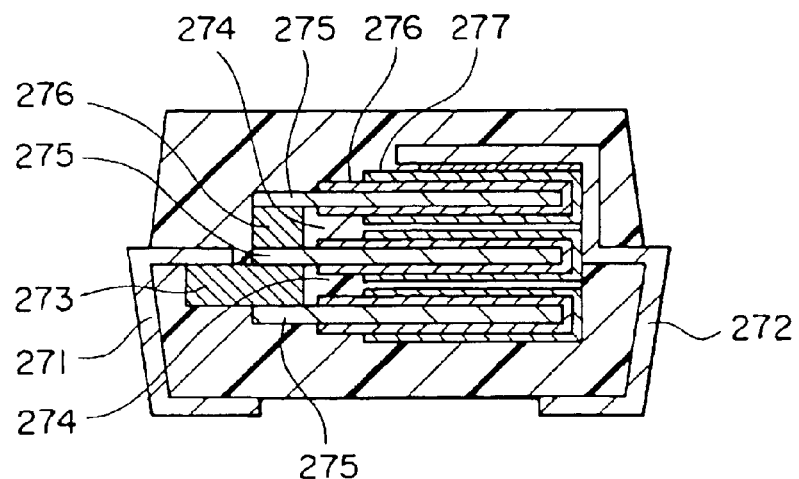
FIG. 1 is a sectional view of a first conventional chip-type solid electrolytic capacitor.
Figure 2:
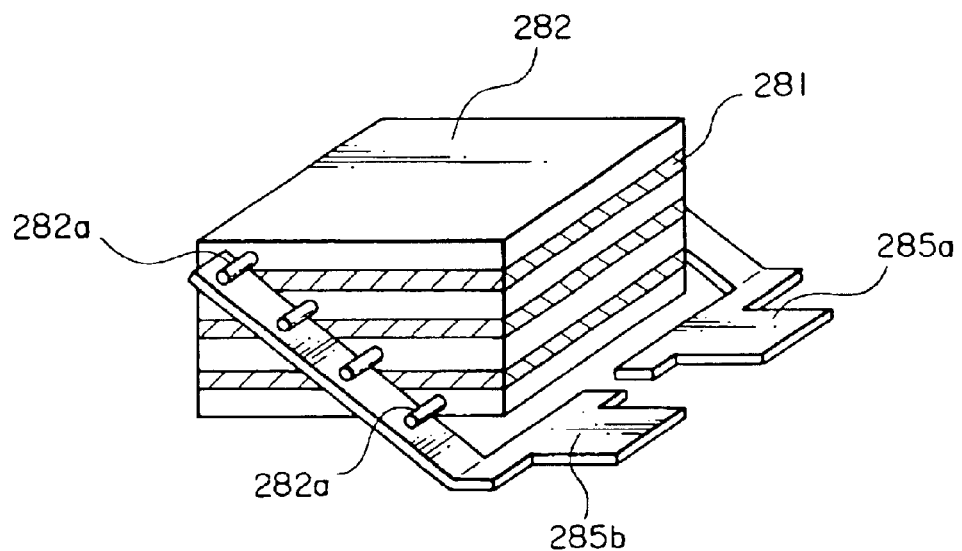
FIG. 2 is a perspective view of a second conventional chip-type solid electrolytic capacitor.
Figure 3:
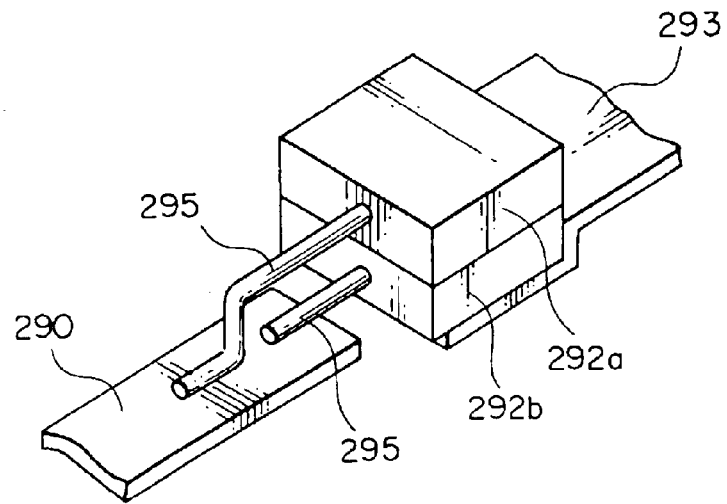
FIG. 3 is a sectional view of a third conventional chip-type solid electrolytic capacitor.

Now, description will be made of several preferred embodiments of this invention with reference to the drawing.

First Embodiment

Figure 4:
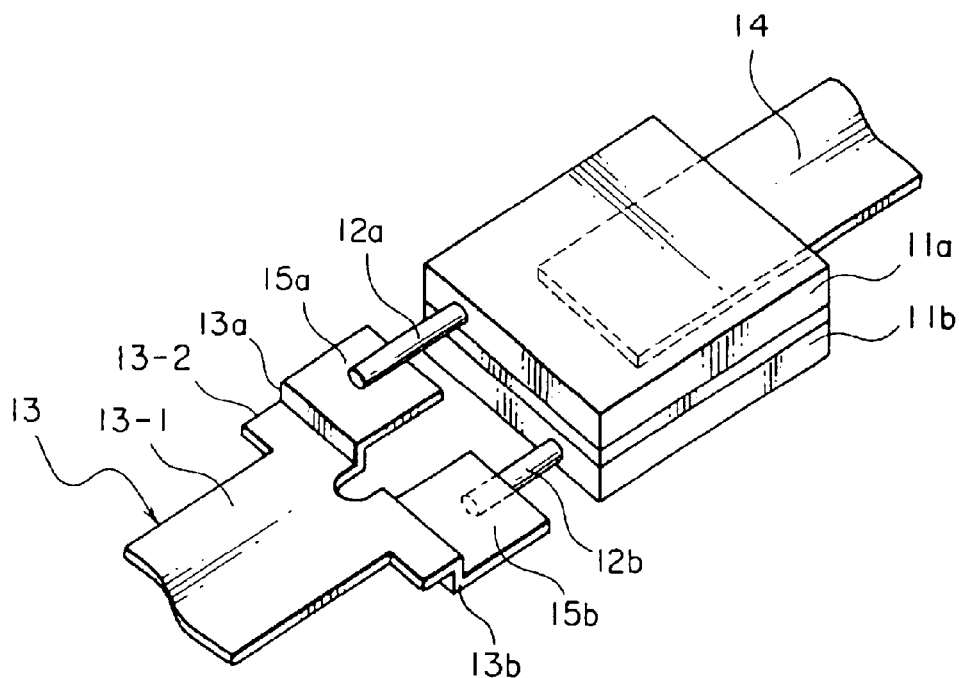
FIG. 4 is a perspective view of a semifinished product of a chip-type solid electrolytic capacitor according to a first embodiment of the present invention.
Figure 4A:
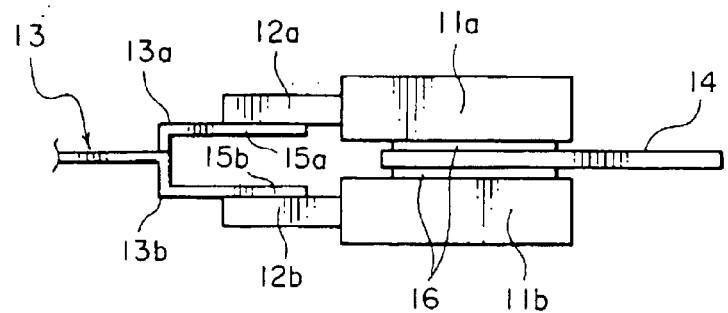
FIG. 4A is a front view of the semifinished product of FIG. 4.

Referring to FIGS. 4 and 4A, a chip-type solid electrolytic capacitor according to a first embodiment of this invention will be described. An anode terminal connecting portion being illustrated in the figure is in the state where a plurality of capacitor elements are laminated and disposed on a lead frame during a production process.

As shown in FIG. 4, the chip-type solid electrolytic capacitor comprises first and second pellet-like capacitor elements 11a and 11b, and first and second anode lead wires 12a and 12b extracted from the first and the second capacitor elements 11a and 11b, respectively. An anode terminal portion 13 and a cathode terminal portion 14 are disposed on opposite side of the capacitor elements 11a and 11b. A combination of the plural pellet-like capacitor elements is referred hereunder to as a capacitor portion.

The anode terminal portion 13 has a body portion 13-1 and an end portion 13-2 integral with the body portion 13-1. The end portion 13-2 is branched into first and second branches 13a and 13b which have first and second branch end portions 15a and 15b, respectively. The first branch end portion 15a is connected to the first anode lead wire 12a by welding while the second branch end portion 15b is connected to the second anode lead wire 12b by welding. The body portion 13-1 extends along a plane flush with an intermediate plane between the first and the second capacitor elements 11a and 11b.

As shown in FIG. 4A, the cathode terminal portion 14 is inserted between the first and the second capacitor elements 11a and 11b and connected through a conductive adhesive 16 to cathode layers thereof which will be described below.

Figure 4B:
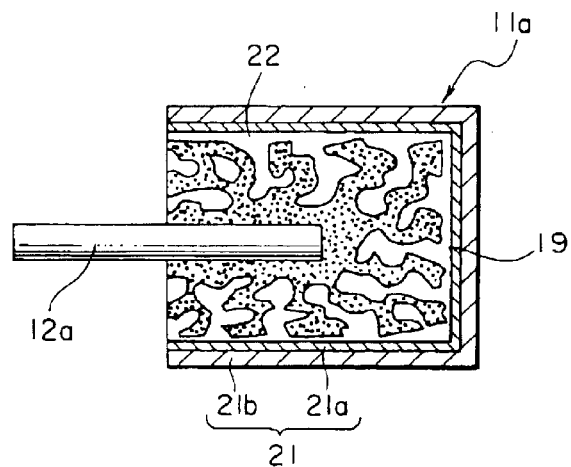
FIG. 4B is a sectional view of a capacitor element included in the semifinished product of FIG. 4.
Figure 4C:
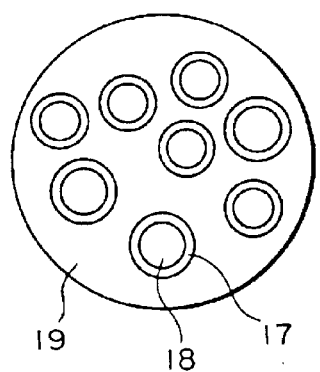
FIG. 4C is an enlarged view of a part of FIG. 4B.

Referring to FIGS. 4B and 4C, the description will briefly be made of preparation of one (11a) of the capacitor elements in case where tantalum is used as a valve metal known in the art. Around a tantalum metal wire, tantalum metal powder is molded by a press and sintered at high vacuum and high temperature to obtain a molded body. Next, an oxide film 17 of $Ta_2O_5$ is formed on the surface of each of particles 18 of the tantalum metal powder. Furthermore, the molded body with the oxide film formed thereon is dipped into manganese nitrate. Through thermal decomposition, a conductive macromolecular part 19 of $MnO_2$ is produced. Subsequently, a cathode layer 21 of graphite layer 21a and Ag layer 21b is formed on the molded body. Thus, the capacitor element 11a is obtained to have an anode member 22 inside thereof in addition to the cathode layer 21 at an outer surface thereof.

A conductive polymer such as polythiophene or polypyrrole may be used as the cathode layer instead of $MnO_2$. In this case, a low ESR can easily be achieved. As the valve metal, niobium, aluminum, titanium, or the like may be used instead of than tantalum.

Figure 5:
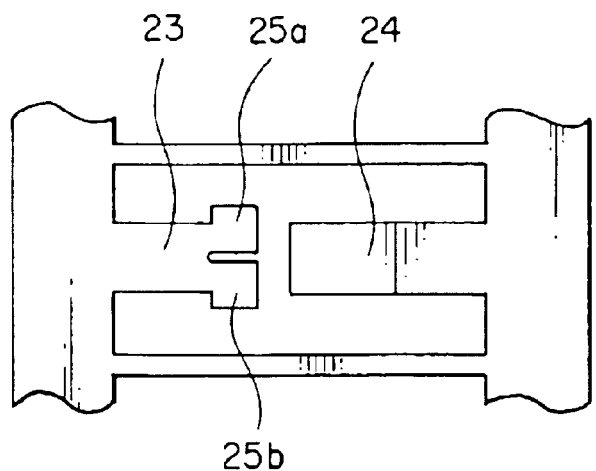
FIG. 5 is a plan view of a lead frame used in the first embodiment.

Referring to FIG. 5, the lead frame used in the first embodiment will be described. An anode terminal portion 23 is symmetrical with respect to a center line thereof. The anode terminal portion 23 has first and second branches 25a and 25b formed at its end. The first and the second branches 25a and 25b are bent frontward and rearward with respect to the plane of the drawing sheet, respectively. Thus, the anode terminal portion 23 is processed to have the branch end portions 15a and 15b illustrated in FIG. 4. In a finished product of the chip-type solid electrolytic capacitor, the above-mentioned bending frontward and rearward corresponds to bending away and towards a mounting surface to be mounted on a substrate.

In the state illustrated in FIG. 4, the first and the second branch end portions 15a and 15b are welded to the first and the second anode lead wires 12a and 12b with the cathode terminal portion 14 is connected to the cathode layers of the first and the second capacitor elements 11a and 11b. Furthermore, the capacitor elements 11a and 11b are molded by an encapsulating resin (37 in FIG. 6) to obtain the molded body. Then, the molded body is cut and separated from the lead frame to obtain the finished product illustrated in FIG. 6.

Figure 6:
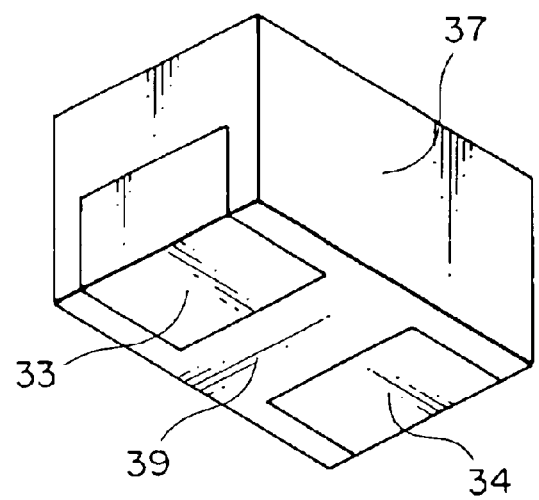
FIG. 6 is a perspective view of a finished product of the chip-type solid electrolytic capacitor according to the first embodiment.

Referring to FIG. 6, the capacitor has an anode terminal 33 and a cathode terminal 34 formed by the anode terminal portion (13, 23) and the cathode terminal portion (14, 24), respectively. Each of the anode terminal 33 and the cathode terminal 34 may have an outer surface flush with that of the encapsulating resin 37 or may be bent along the outer surface of the encapsulating resin 37.

In the finished product described referring to FIGS. 4–6, the capacitor elements 11a and 11b of the capacitor portion are laminated in a predetermined direction perpendicular to a mounting surface 39 of the finished product. Each of the capacitor elements 11a and 11b uses the valve metal. The cathode terminal 34 is led out from the capacitor portion. The anode lead wires 12a and 12b are led out from the capacitor portion in parallel to the mounting surface. The anode lead wires 12a and 12b are positioned apart from each other in the predetermined direction. The anode terminal 33 is connected to the anode lead wires 12a and 12b. The encapsulating resin 37 encapsulates the capacitor portion with the anode and the cathode terminals 33 and 34 partially exposed. The branch end portions 15a and 15b are positioned apart from each other in the predetermined direction and welded to the anode lead wires 12a and 12b, respectively.

In the finished product described referring to FIGS. 4–6, the capacitor elements 11a and 11b is laminated in a predetermined direction perpendicular to a mounting surface of the finished product. Each of the capacitor elements 11a and 11b uses the valve metal. The anode member 22 and the cathode layer 21 are mechanically coupled to each other. Each of the anode lead wires 12a and 12b is led out from the anode member 22 in parallel to the mounding surface. The anode terminal 33 is connected to the anode lead wires 12a and 12b. The cathode terminal 34 is connected to the cathode layer 21. The encapsulating resin 37 encapsulates the capacitor elements 11a and 11b with the anode and the cathode terminals 33 and 34 partially exposed. The branch end portions 15a and 15b of the branches 13a and 13b of the anode terminal 33 are formed by shaping. In this connection, it is to be noted, the branch end portions 15a and 15b has shapes substantially same to each other so that the branch end portions 15a and 15b overlap each other by rotation of 180° around a straight line at an intermediate position between the anode lead wires 12a and 12b. The branch end portions 15a and 15b are welded to the anode lead wires 12a and 12b to produce welded portions, respectively.

Figures 7A, 7B:
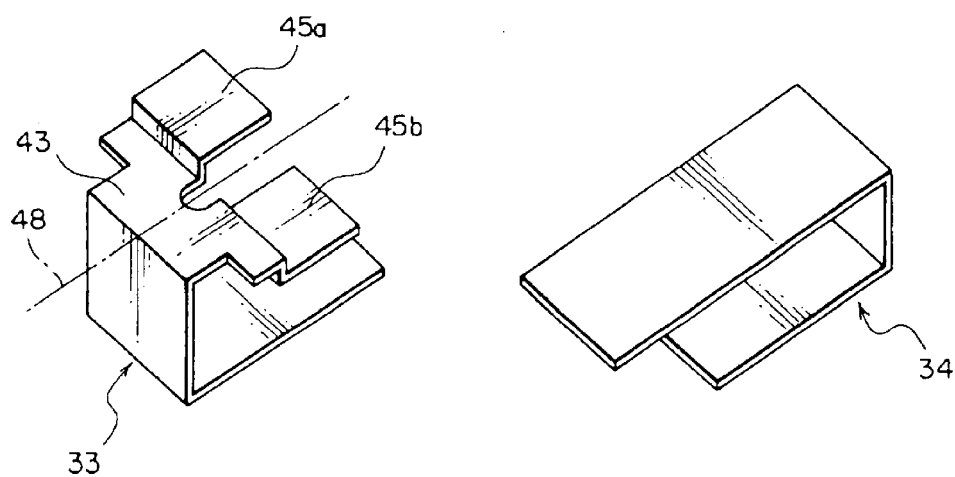
FIG. 7A is a perspective view of an anode terminal included in the chip-type solid electrolytic capacitor of FIG. 6.
FIG. 7B is a perspective view of a cathode terminal included in the chip-type solid electrolytic capacitor of FIG. 6.

Referring to FIGS. 7A and 7B, the description will be made of the anode terminal 33 and the cathode terminal 34 included in the chip-type solid electrolytic capacitor as the finished product.

Referring to FIG. 7A, the anode terminal has a first branch 45a, a second branch 45b, and an anode terminal body 43. As illustrated in the figure, the first and the second branches 45a and 45b are configured so that they overlap each other by rotation of 180° with respect to a center line 48.

With the above-mentioned structure, the anode terminal connecting portion has a symmetrical structure with respect to an intermediate plane between the two capacitor elements as a plane of symmetry. In particular, if a welding point at the first branch and a welding point at the second branch are disposed on opposite surfaces away from each other in the vertical direction, a completely symmetrical structure is achieved. Depending upon the type of a welding facility, the welding points may be placed on opposite surfaces facing each other.

Since the two welding portions are not placed on the same plane in close proximity to each other, the connecting portion is free from an interference between welding nuggets at the welding portions.

Referring to FIG. 7B, the cathode terminal has three flat planes. One of the flat planes is inserted between the first and the second capacitor elements to be connected to the cathode layers thereof while the remaining flat planes serve as a fillet and a terminal portion on the mounting surface.

Second Embodiment

Figure 8:
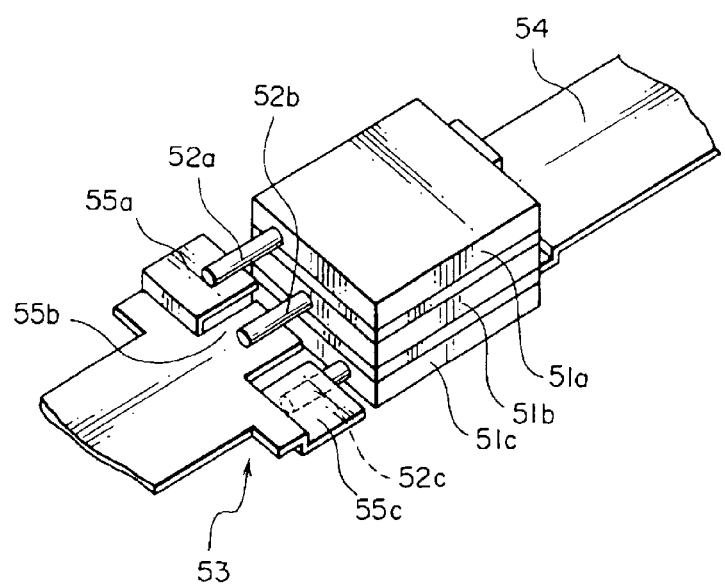
FIG. 8 is a perspective view of a semifinished product of a chip-type solid electrolytic capacitor according to a second embodiment of the present invention.

Referring to FIG. 8, a chip-type solid electrolytic capacitor according to a second embodiment of this invention will be described. In an anode terminal connecting portion being illustrated in the figure, a plurality of capacitor elements are laminated and disposed on a lead frame.

As shown in FIG. 8, an anode terminal portion 53 has an end portion branched into first, second, and third branches 55a, 55b, and 55c which are welded to first, second, and third anode lead wires 52a, 52b, and 52c, respectively.

The chip-type solid electrolytic capacitor comprises first, second, and third capacitor elements 51a, 51b, and 51c laminated one on another. A cathode terminal portion 54 has two branches which are inserted between the first and the second capacitor elements 51a and 51b and between the second and the third capacitor elements 51b and 51c, respectively, to be connected to cathode layers of the capacitor elements.

Figure 9:
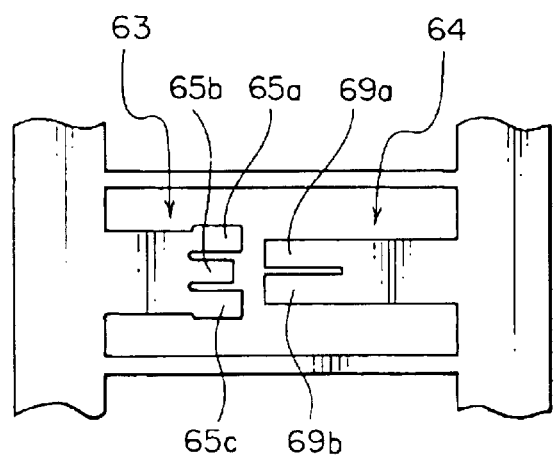
FIG. 9 is a plan view of a lead frame used in the second embodiment.

Referring to FIG. 9, the lead frame has an anode terminal portion 63 (53 in FIG. 8) having an end portion branched into first, second, and third branches 65a, 65b, and 65c (55a, 55b, and 55c in FIG. 8) and has a symmetrical shape with respect to a center line. The first and the third branches 65a and 65c are bent frontward and rearward with respect to the plane of the drawing sheet, respectively. Then, the anode terminal portion 63 having the shape illustrated in FIG. 8 is obtained.

After bending, the first and the third branches are configured so that they substantially overlap each other by rotation of 180° around the center line of the anode terminal portion.

On the other hand, a cathode terminal portion 64 (54 in FIG. 8) has an end portion branched into first and second branches 69a and 69b. One of the first and the second branches 69a and 69b is bent frontward and the other is bent rearward with respect to the plane of the drawing sheet. The configuration is similar to that of the anode terminal portion having two branches in the first embodiment.

With the above-mentioned structure, the chip-type solid electrolytic capacitor comprising three pellet-like capacitor elements laminated one on another and connected in parallel is small in size, thin in profile, high in capacitance, and low in ESR.

In the finished product of the chip-type solid electrolytic capacitor according to the second embodiment, the capacitor elements 51a, 51b, and 51c are laminated in the predetermined direction. Each of the capacitor elements 51a, 51b, and 51c uses the valve metal and having the anode member and the cathode layer in the manner described in conjunction with FIG. 4B. Each of the anode lead wires 52a, 52b, and 52c is led out from the anode member in parallel to the mounting surface. The anode terminal portion 53 is processed into an anode terminal connected to the anode lead wires 52a, 52b, and 52c. The cathode terminal portion 54 is processed into a cathode terminal connected to the cathode layer. In the manner similar to the first embodiment, an encapsulating resin encapsulates the capacitor elements 51a, 51b, and 51c with the anode and the cathode terminals partially exposed. Within the encapsulating resin, the branches 65a, 65b, and 65c has a first, a second, and a third branch end portion, respectively, which are formed by shaping in the manner similar to the first embodiment. In this connection, it is to be noted that the first and the third branch end portions have shapes so as to overlap each other by rotation of 180° around a straight line and that the second branch end portion is between the first and the third branch end portions. Furthermore, the first, the second, and the third branch end portions are welded to the anode lead wires to produce welded portions, respectively.

Third Embodiment

Figure 10:
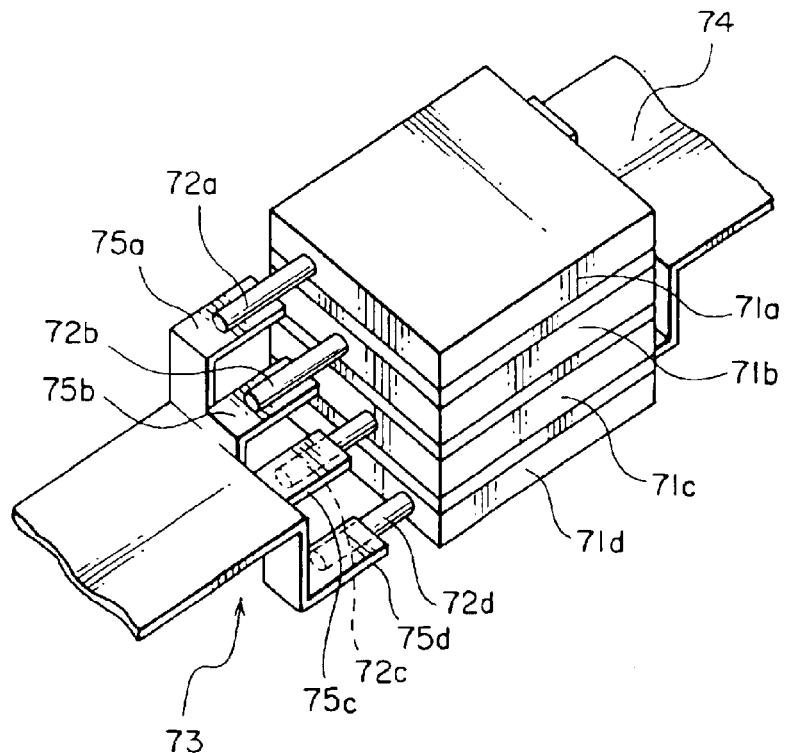
FIG. 10 is a perspective view of a semifinished product of a chip-type solid electrolytic capacitor according to a third embodiment of the present invention.

Referring to FIG. 10, a chip-type solid electrolytic capacitor according to a third embodiment of this invention will be described. In an anode terminal connecting portion being illustrated in the figure, a plurality of capacitor elements are laminated and disposed on a lead frame.

As shown in FIG. 10, an anode terminal portion 73 has an end portion separated into first, second, third, and fourth branches 75a, 75b, 75c, and 75d which are welded to first, second, third, and fourth anode lead wires 72a, 72b, 72c, and 72d, respectively.

The chip-type solid electrolytic capacitor comprises first, second, third, and fourth capacitor elements 71a, 71b, 71c, and 71d laminated one on another. A cathode terminal portion 74 has three branches which are inserted between the first and the second capacitor elements 71a and 71b, between the second and the third capacitor elements 71b and 71c, and between the third and the fourth capacitor elements 71c and 71d, respectively, to be connected to cathode layers of the capacitor elements.

Figure 11:
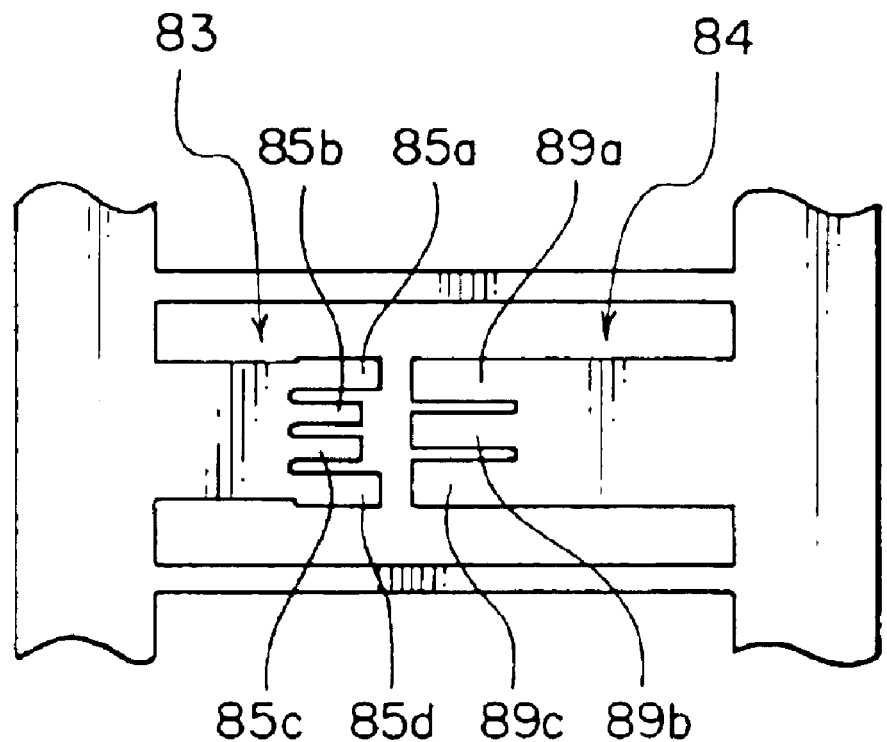
FIG. 11 is a plan view of a lead frame used in the third embodiment.

Referring to FIG. 11, the lead frame has an anode terminal portion 83 (73 in FIG. 10) having an end portion branched into first, second, third, and fourth branches 85a, 85b, 85c, and 85d (75a, 75b, 75c, and 75d in FIG. 10) and has a symmetrical shape with respect to a center line. The first and the second branches 85a and 85b are bent frontward while the third and the fourth branches 85c and 85d are bent rearward with respect to the plane of the drawing sheet. Then, the anode terminal portion 83 having the shape illustrated in FIG. 10 is obtained.

After bending, the first and the fourth branches 85a and 85d are configured so that they overlap each other by rotation of 180° with respect to the center line of the anode terminal portion. Likewise, the second and the third branches 85b and 85c are configured so that they overlap each other by rotation of 180° with respect to the center line of the anode terminal portion.

On the other hand, a cathode terminal portion 84 (74 in FIG. 10) has an end portion branched into first, second, and third branches 89a, 89b, and 89c. The first, the second, and the third branches 89a, 89b, and 89c are bent in the manner similar to the anode terminal in the second embodiment (see FIG. 8) and connected to cathode layers of the capacitor elements.

In the finished product of the chip-type solid electrolytic capacitor according to the third embodiment, the capacitor elements 71a, 71b, 71c, 71d are laminated in the predetermined direction. Each of the capacitor elements 71a, 71b, 71c, 71d uses the valve metal and having the anode member and the cathode layer in the manner described in conjunction with FIG. 4B. Each of the anode lead wires 72a, 72b, 72c, and 72d is led out from the anode member in parallel to the mounting surface. The anode terminal portion 73 is processed into an anode terminal connected to the anode lead wires 72a, 72b, 72c, and 72d. The cathode terminal portion 74 is processed into a cathode terminal connected to the cathode layer. In the manner similar to the first embodiment, an encapsulating resin encapsulates the capacitor elements 71a, 71b, 71c, and 71d with the anode and the cathode terminals partially exposed. Within the encapsulating resin, the branches 75a, 75b, 75c, and 75d has a first, a second, a third, and a fourth branch end portion, respectively, which are formed by shaping. In this connection, it is to be noted that the first and the fourth branch end portions have shapes so as to overlap each other by rotation of 180° around a straight line and that the second and the third branch end portions are between the first and the fourth branch end portions and have shapes so as to overlap each other by rotation of 180° around the straight line. Furthermore, the first, the second, the third, and the fourth branch end portions are welded to the anode lead wires to produce welded portions, respectively.

Fourth Embodiment

In each of the first through the third embodiments, description has been made of the chip-type solid electrolytic capacitor formed by laminating the capacitor elements each of which has the anode lead wire extracted on one side from the anode member of a valve metal in parallel to the mounting surface. On the other hand, a chip-type solid electrolytic capacitor in a fourth embodiment of this invention comprises two capacitor elements each of which has an anode lead wire extracted on opposite sides from an anode member of a valve metal, and two anode terminals each of which has two branches at its end portion like in the first embodiment.

Figure 12A:
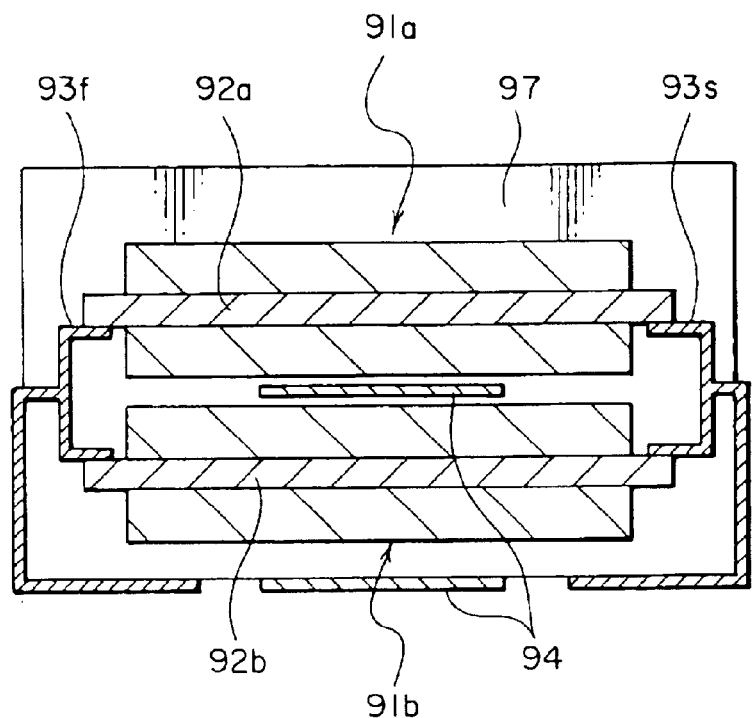
FIG. 12A is a schematic view of a whole structure of a chip-type solid electrolytic capacitor according to a fourth embodiment of the present invention.
Figure 12B:
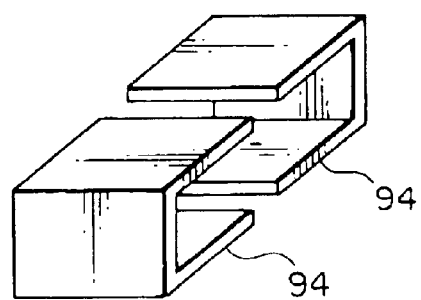
FIG. 12B is a perspective view of a cathode terminal included in the chip-type solid electrolytic capacitor of FIG. 12A.
Figure 12C:
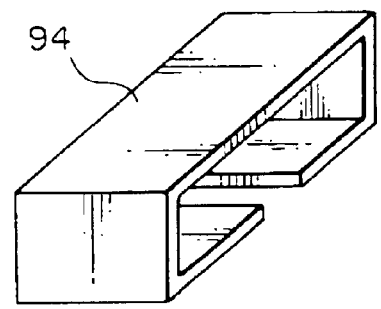
FIG. 12C is a perspective view of a modification of the cathode terminal.

Referring to FIGS. 12A through 12C, the chip-type solid electrolytic capacitor according to the fourth embodiment has first and second capacitor elements 91a and 91b with anode lead wires 92a and 92b, respectively. The anode lead wire 92a has one end extracted leftward and connected to one branch of a first anode terminal 93f and the other end extracted rightward and connected to one branch of a second anode terminal 93s. The branches of each anode terminal are similar in shape to those in the first embodiment (see FIGS. 4 and 7A) although not exactly shown in FIG. 12A.

Figure 13:
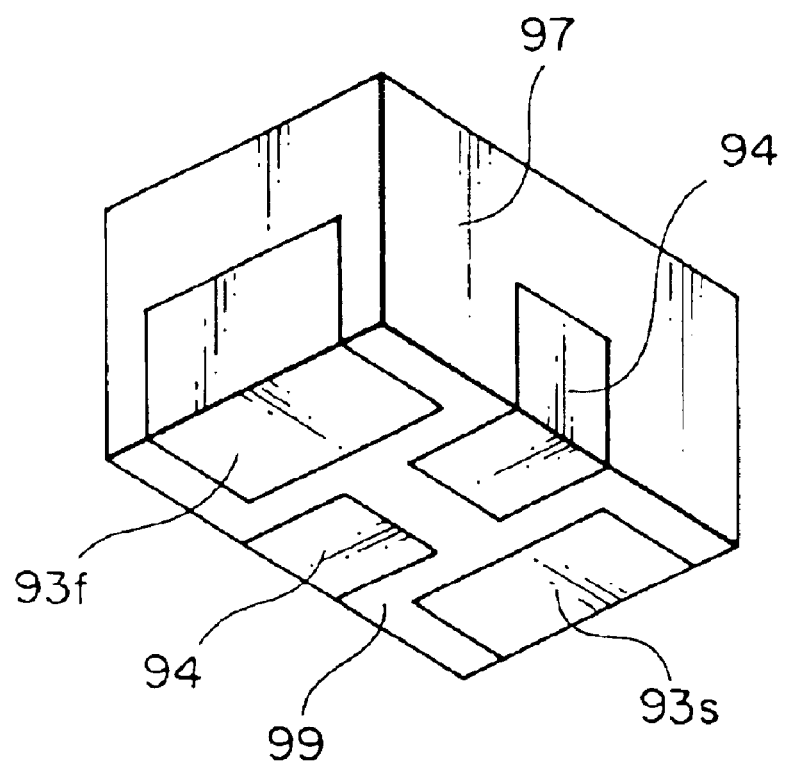
FIG. 13 is a perspective view of a finished product of the chip-type solid electrolytic capacitor according to the fourth embodiment.

Referring to FIG. 12B, a cathode terminal 94 comprises a pair of U-shaped metal conductors each of which has one end inserted between cathode layers on a lower surface of the first capacitor element 91a and on an upper surface of the second capacitor element 91b to be connected thereto and the other end exposed on a lower surface or a mounting surface of a finished product to be connected to a wiring of a substrate or the like. Referring to FIG. 12C, the cathode terminal 94 may have an integral shape. In the finished product illustrated in FIG. 13, the first and the second anode terminals 93f and 93s and the cathode terminal 94 are partially exposed from an encapsulating resin 97.

The chip-type solid electrolytic capacitor with the anode lead wires extracted on opposite sides of the anode member may be operated as a transmission-line noise filter in a power supply circuit of a CPU or a decoupling circuit. The operation of the transmission-line noise filter is similar to that of a distributed-constant noise filter described, for example, in Japanese Patent Application Publication No. 2002-164760.

As the noise filter, the chip-type solid electrolytic capacitor in the fourth embodiment achieves a small size, a thin profile, a high capacitance, and a low ESR.

In the finished product of the chip-type solid electrolytic capacitor according to the forth embodiment, the capacitor elements 91a and 91b of the capacitor portion are laminated in the predetermined direction. Each of the capacitor elements 91a and 91b uses the valve metal. In the finished product, the cathode terminal 94 is led out from the capacitor portion. The anode lead wires 92a and 92b are led out from the capacitor portion in parallel to a mounting surface 99. The anode lead wires 92a and 92b are positioned apart from each other in the predetermined direction. The anode terminals 93f and 93s are connected to the anode lead wires 92a and 92b. The encapsulating resin 97 encapsulates the capacitor portion with the anode and the cathode terminals 93f, 93s, and 94 partially exposed. Each of the anode terminals 93f and 93s includes a plurality of branch end portions which are positioned apart from each other in the predetermined direction and welded to the anode lead. wires, respectively.

Fifth Embodiment

Figure 14A:
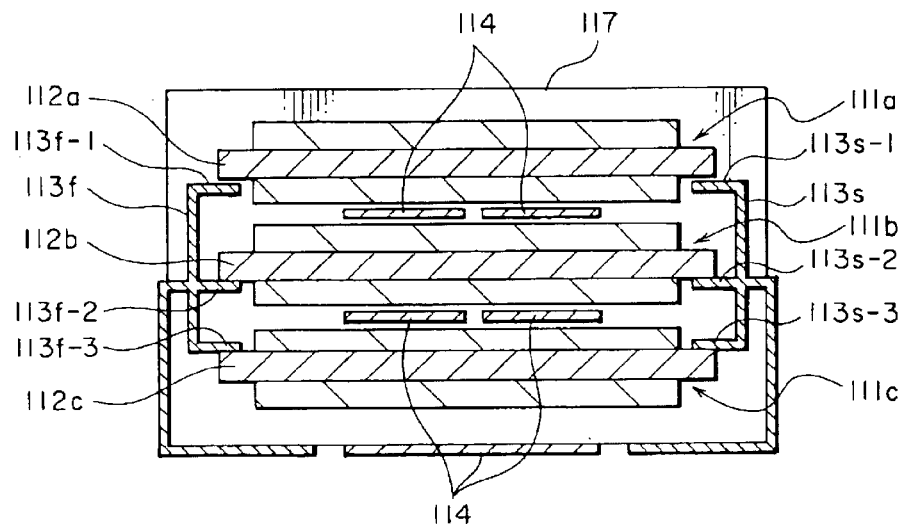
FIG. 14A is a schematic view of a whole structure of a chip-type solid electrolytic capacitor according to a fifth embodiment of this invention.
Figure 14B:
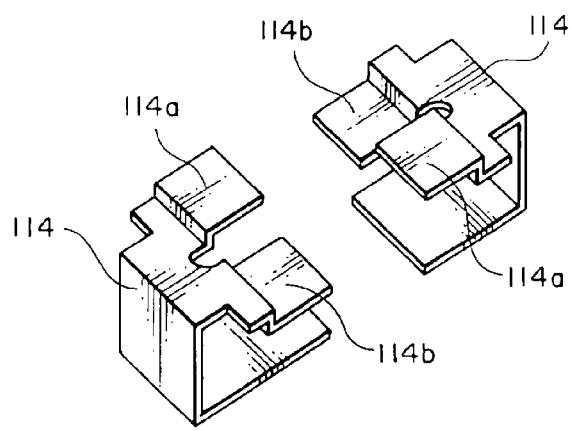
FIG. 14B is a perspective view of a cathode terminal included in the chip-type solid electrolytic capacitor of FIG. 14A.

Referring to FIGS. 14A and 14B, a chip-type solid electrolytic capacitor according to a fifth embodiment will be described. The chip-type solid electrolytic capacitor comprises three capacitor elements each of which has an anode lead wire extracted on opposite sides, and two anode terminals each of which has three branches like in the second embodiment.

Referring to FIG. 14A, the chip-type solid electrolytic capacitor has first, second, and third capacitor elements 111a, 111b, and 111c with first, second, and third anode lead wires 112a, 112b, and 112c, respectively. The first anode lead wire 112a of the first capacitor element 121a has a left end welded to a first anode terminal 113f and a right end welded to a second anode terminal 113s. Each of the second and the third lead wires 112b and 112c of the second and the third capacitor elements 111b and 111c is similarly connected to the first and the second anode terminals 113f and 113s.

The branches of each anode terminal are similar in shape to those in the second embodiment (see FIG. 8) although not exactly shown in FIG. 14A.

Each of cathode terminals 114 comprises a pair of metal conductors each of which has one end provided with two branches. One of the branches is inserted between cathode layers on a lower surface of the first capacitor element 111a and on an upper surface of the second capacitor element 111b to be connected thereto. The other branch is inserted between cathode layers on a lower surface of the second capacitor element 111b and on an upper surface of the third capacitor element 111c to be connected thereto. The other end of each of the metal conductors of the cathode terminals 114 is exposed on a lower surface of a finished product to be connected to a wiring of a substrate or the like.

In the finished product of the chip-type solid electrolytic capacitor according to the fifth embodiment, the capacitor elements 111a, 111b, and 111c of the capacitor portion are laminated in the predetermined direction. Each of the capacitor elements 111a, 111b, and 111c uses the valve metal. In the finished product, each of the cathode terminals 114 is led out from the capacitor portion. The anode lead wires 112a, 112b, and 112c are led out from the capacitor portion in parallel to the mounting surface. The anode lead wires 112a, 112b, and 112c are positioned apart from each other in the predetermined direction. The anode terminals 113f and 113s are connected to the anode lead wires 112a, 112b, and 112c. An encapsulating resin 117 encapsulates the capacitor portion with the anode and the cathode terminals 113f, 113s, and 114 partially exposed. The anode terminal 113f includes a plurality of branch end portions 113f-1, 113f-2, and 113f-3 positioned apart from each other in the predetermined direction. The branch end portions 113f-1, 113f-2, and 113f-3 are welded to the anode lead wires 112a, 112b, and 112c, respectively. The other anode terminal 113s includes a plurality of branch end portions 113s-1, 113s-2, and 113s-3 positioned apart from each other in the predetermined direction. The branch end portions 113s-1, 113s-2, and 113s-3 are welded to the anode lead wires 112a, 112b, and 112c, respectively.

In addition, the cathode layers are positioned apart from each other in the predetermined direction. Each of the cathode terminals 114 includes a plurality of branch end portions 114a and 114b positioned apart from each other in the predetermined direction. The branch end portions 114a and 114b are connected to the cathode layers, respectively.

Sixth Embodiment

Figure 15A:
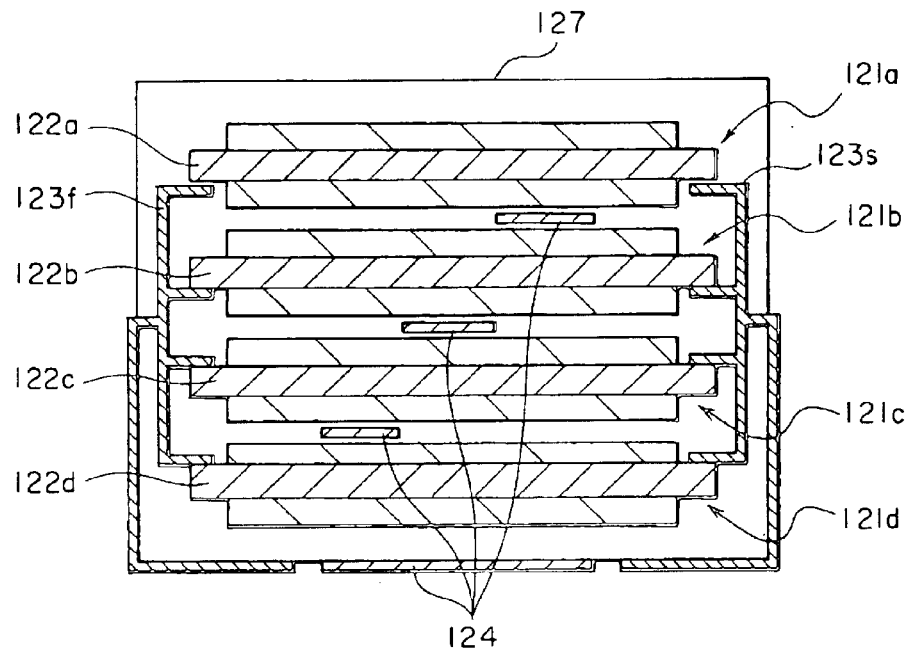
FIG. 15A is a schematic view of a whole structure of a chip-type solid electrolytic capacitor according to a sixth embodiment of the present invention.
Figures 15B, 15C:
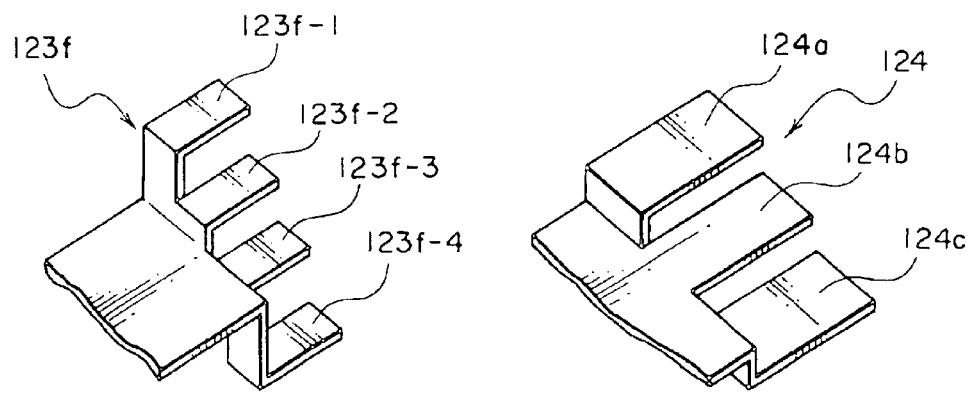
FIG. 15B is a perspective view of an anode terminal included in the chip-type solid electrolytic capacitor of FIG. 15A.
FIG. 15C is a perspective view of a cathode terminal included in the chip-type solid electrolytic capacitor of FIG. 15A.

Referring to FIGS. 15A through 15C, a chip-type solid electrolytic capacitor according to a sixth embodiment will be described. The chip-type solid electrolytic capacitor comprises four capacitor elements with anode lead wires extracted on opposite sides, and two anode terminals each of which has four branches like in the third embodiment.

Referring to FIG. 15A, the chip-type solid electrolytic capacitor comprises first, second, third, and fourth capacitor elements 121a, 121b, 121c, and 121d with first, second, third, and fourth anode lead wires 122a, 122b, 122c, and 122d, respectively.

The first anode lead wire 122a of the first capacitor element 121a has a left end welded to a first anode terminal 123f and a right end welded to a second anode terminal 123s. Each of the second, the third, and the fourth anode lead wires 122b, 122c, and 122d of the second, the third, and the fourth capacitor elements 121b, 121c, and 121d is similarly welded to the first anode terminal 123f and the second anode terminal 123s.

Referring to FIG. 15B, each of the anode terminals has four branches similar to those in the third embodiment (see FIG. 10) although not exactly shown in FIG. 12A.

A cathode terminal 124 has one end provided with three branches. The first branch is inserted between cathode layers on a lower surface of the first capacitor element 121a and on an upper surface of the second capacitor element 121b to be connected thereto. The second branch is inserted between cathode layers on a lower surface of the second capacitor element 121b and on an upper surface of the third capacitor element 121c to be connected thereto. The third branch is inserted between cathode layers on a lower surface of the third capacitor element 121c and on an upper surface of the fourth capacitor element 121d to be connected thereto. The other end of the cathode terminal 124 is exposed on a lower surface or a mounting surface of a finished product to be connected to a wiring of a substrate or the like.

In the finished product of the chip-type solid electrolytic capacitor according to the sixth embodiment, the capacitor elements 121a, 121b, 121c, and 121d of the capacitor portion are laminated in the predetermined direction. Each of the capacitor elements 121a, 121b, 121c, and 121d uses the valve metal. In the finished product, each of the cathode terminals 124 is led out from the capacitor portion. The anode lead wires 122a, 122b, 122c, and 122d are led out from the capacitor portion in parallel to the mounting surface. The anode lead wires 122a, 122b, 122c, and 122d are positioned apart from each other in the predetermined direction. The anode terminals 123f and 123s are connected to the anode lead wires 122a, 122b, 122c, and 122d. An encapsulating resin 127 encapsulates the capacitor portion with the anode and the cathode terminals 123f, 123s, and 124 partially exposed. As shown in FIG. 15B, the anode terminal 123f includes a plurality of branch end portions 123f-1, 123f-2, 123f-3, and 123f-4 positioned apart from each other in the predetermined direction. The branch end portions 123f-1, 123f-2, 123f-3, and 123f-4 are welded to the anode lead wires 122a, 122b, 122c, and 122d, respectively. The other anode terminal 123s includes a plurality of branch end portions positioned apart from each other in the predetermined direction. The branch end portions of the other anode terminal 123s are also welded to the anode lead wires 122a, 122b, 122c, and 122d, respectively.

In addition, the cathode layers are positioned apart from each other in the predetermined direction. Each of the cathode terminals 124 includes a plurality of branch end portions 124a, 124b, and 124c positioned apart from each other in the predetermined direction as shown in FIG. 15C. The branch end portions 124a, 124b, and 124c are connected to the cathode layers, respectively. The cathode terminal 124 may comprise two metal conductor members faced to each other as shown in FIG. 14B or may comprise a single metal conductor member.

In each of the first through the sixth embodiments, a boundary between the anode terminal body and the branches is located inside the encapsulating resin. On the other hand, in each of seventh through twelfth embodiments, the boundary between the anode terminal body and the branches is located on a side surface of the finished product.

Seventh Embodiment

Figure 16:
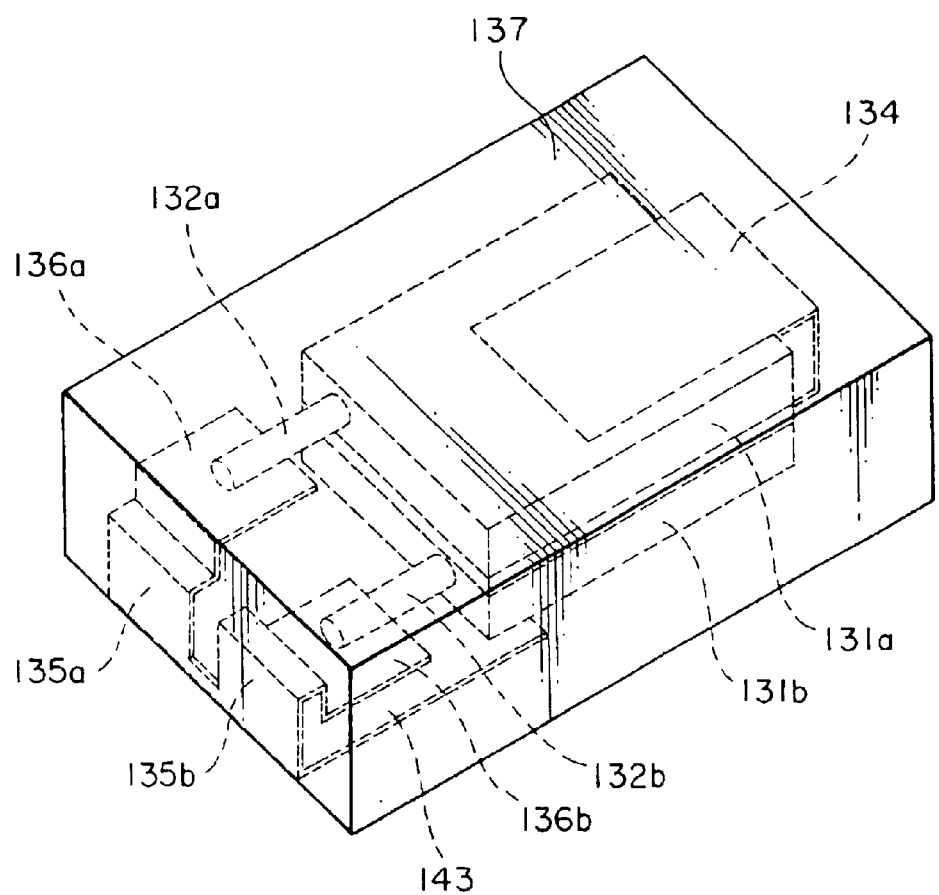
FIG. 16 is a perspective view of a chip-type solid electrolytic capacitor according to a seventh embodiment of the present invention.

Referring to FIG. 16, a chip-type solid electrolytic capacitor according to the seventh embodiment will be described. The chip-type solid electrolytic capacitor comprises a pair of pellet-like capacitor elements 131a and 131b, first and second anode lead wires 132a and 132b, an anode terminal 143, and a cathode terminal 134.

The anode terminal 143 extending from a mounting surface to a side surface of a finished product is branched on the side surface into first and second branches 135a and 135b. The first branch 135a has an end portion bent upward to form a first branch end portion 136a which is welded to the first anode lead wire 132a. The second branch 135b has an end portion bent downward to form a second branch end portion 136b which is welded to the second anode lead wire 132b.

On the other hand, the cathode terminal 134 has one end inserted between the first and the second capacitor elements 131a and 131b to be connected to cathode layers. In the finished product, the above-mentioned components are encapsulated in an encapsulating resin 137.

Figure 17A:
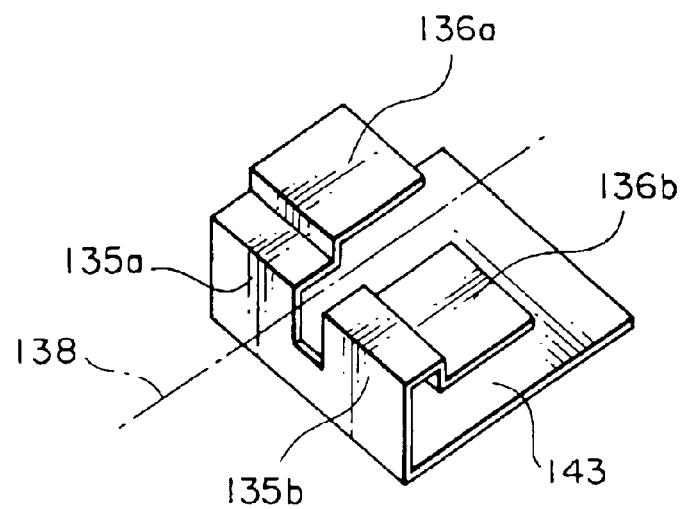
FIG. 17A is a perspective view of an anode terminal included in the chip-type solid electrolytic capacitor of FIG. 16.
Figure 17B:
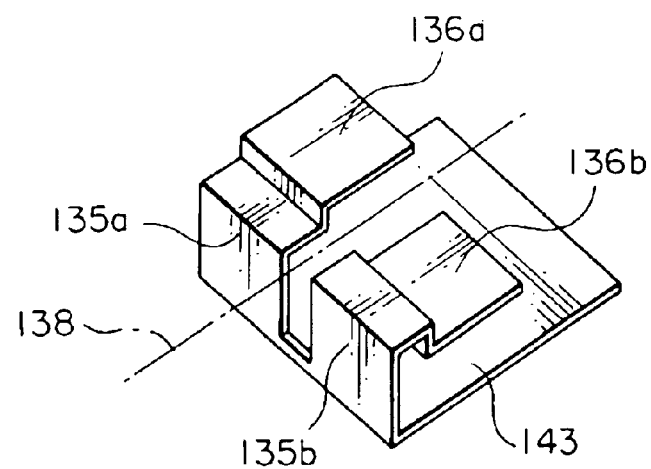
FIG. 17B is a perspective view of a modification of the anode terminal.

Referring to FIG. 17A, the anode terminal 143 has the shape described in conjunction with FIG. 16. Referring to FIG. 17B, the anode terminal 143 is modified in that a space between the two branches 135a and 135b is lengthened.

Figure 18A:
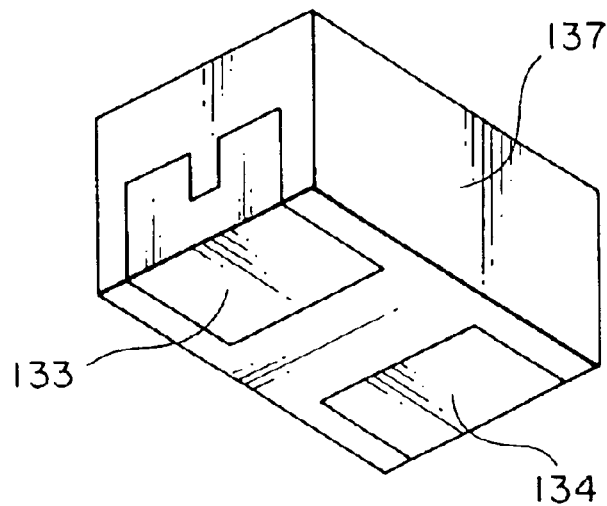
FIG. 18A is a perspective view of a finished product of the chip-type solid electrolytic capacitor according to the seventh embodiment in case of the anode terminal in FIG. 17A.
Figure 18B:
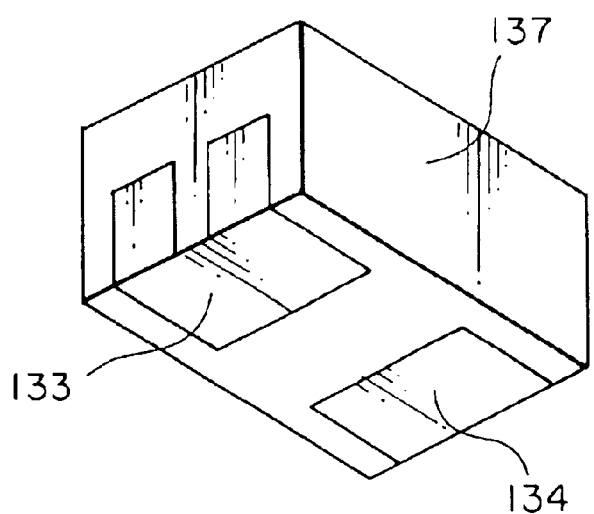
FIG. 18B is a perspective view of a finished product of the chip-type solid electrolytic capacitor according to the seventh embodiment in case of the anode terminal in FIG. 17B.

Referring to FIGS. 18A and 18B, the chip-type solid electrolytic capacitor in the seventh embodiment as the finished product has external appearances illustrated in the figures in case where the anode terminals in FIG. 17A and FIG. 17B are used, respectively.

As illustrated in each of FIGS. 17A and 17B, the first and the second branch end portions 136a and 136b to be welded to the anode lead wires are configured so that they overlap each other by rotation of 180° around a straight line 138. In this respect, the seventh embodiment is similar to the first embodiment. As illustrated in FIGS. 17B and 18B, if the space between the first branch having the first branch end portion and the second branch having the second branch end portion is lengthened, the volume occupied by the bent portion is reduced. As a result, the volume occupied by the anode connecting portion with respect to the total volume of the finished product can be reduced.

In other respects, the seventh embodiment is similar to the first embodiment. For example, the lead frame in the seventh embodiment is similar in shape to that in the first embodiment except that the space between the first and the second branches is lengthened. The production process is also similar.

Further, the seventh embodiment is similar in effect to the first embodiment in that no interference is caused between two welded portions and that no variation in connecting strength is caused.

In the seventh embodiment, the first branch end portion 136a is disposed under the first anode lead wire 132a to be welded thereto while the second branch end portion 136b is disposed on the second anode lead wire 132b to be welded thereto. With this structure, it is possible to reduce the amount of bending the branch end portion upward or downward. If the first anode lead wire 132a is decentered downward in the first capacitor element 131a laminated upside and the second anode lead wire 132b is decentered upward in the second capacitor element 131b laminated downside, the difference in height between the first and the second anode lead wires 132a and 132b is reduced. Therefore, the amount of bending the branch end portion upward or downward can be reduced further so as to achieve a highly reliable connection structure.

Eighth Embodiment

Figure 19:
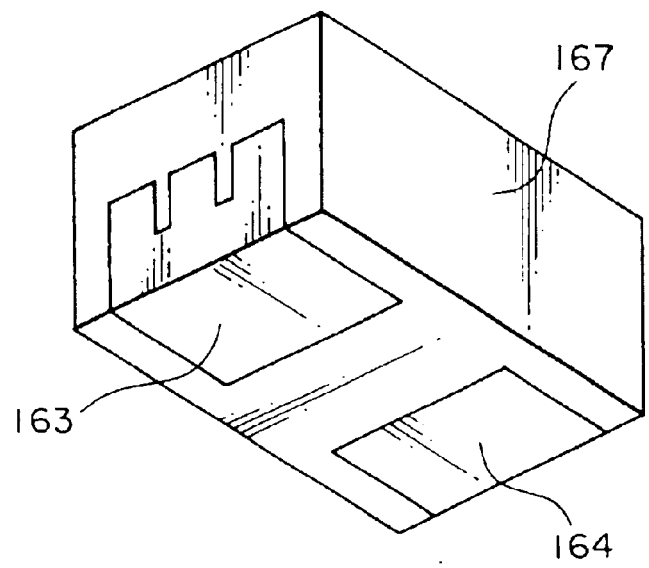
FIG. 19 is a perspective view of a finished product of a chip-type solid electrolytic capacitor according to an eighth embodiment of the present invention.
Figure 20:
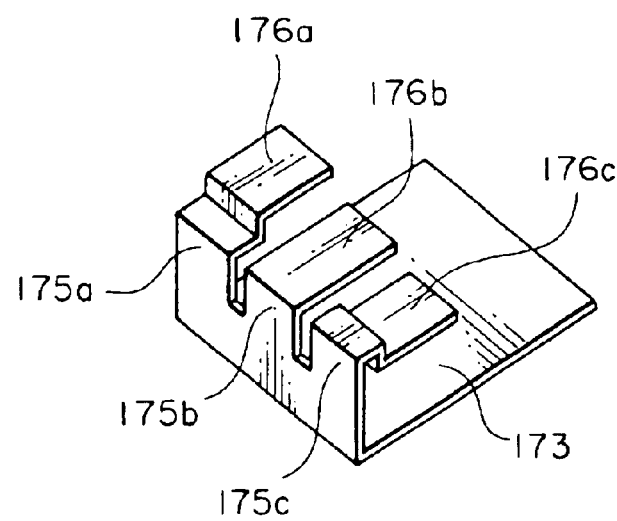
FIG. 20 is a perspective view of an anode terminal included in the chip-type solid electrolytic capacitor of FIG. 19.

Referring to FIGS. 19 and 20, a chip-type solid electrolytic capacitor according to the eighth embodiment will be described. As shown in FIG. 19, the chip-type solid electrolytic capacitor has an anode terminal 163, a cathode terminal 164, and an encapsulating resin 167.

Referring to FIG. 20, the anode terminal has an anode terminal body 173 and first, second, and third branches 175a, 175b, and 175c provided with first, second, and third branch end portions 176a, 176b, and 176c, respectively.

In the eighth embodiment, a boundary between the anode terminal body 173 extending from a mounting surface to a part of a side surface of a finished product and each of the first, the second, and the third branches 175a, 175b, and 175c is located on the side surface of the finished product. At end portions of the first, the second, and the third branches 175a, 175b, and 175c, the first, the second, and the third branch end portions 176a, 176b, and 176c are formed by bending to be welded to the anode lead wires, respectively. Except the above, the eighth embodiment is similar to the second embodiment.

Therefore, the eighth embodiment not only achieves the effect similar to that of the second embodiment but also enables reduction in volume occupied by the anode connecting portion like in the seventh embodiment.

Ninth Embodiment

Figure 21:
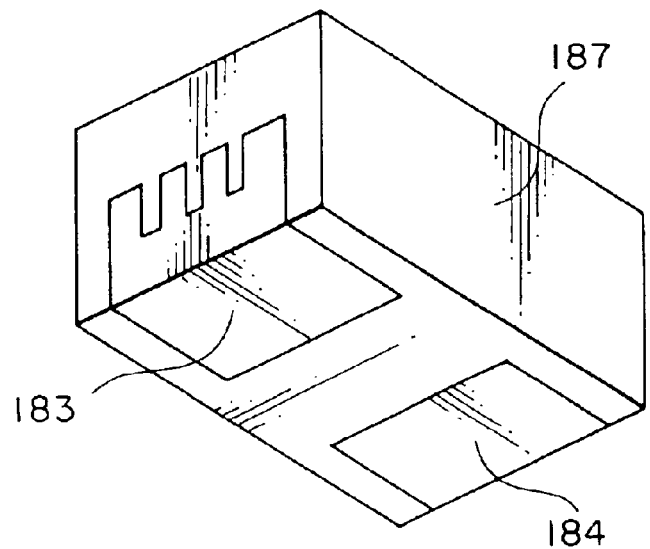
FIG. 21 is a perspective view of a finished product of a chip-type solid electrolytic capacitor according to a ninth embodiment of the present invention.
Figure 22:
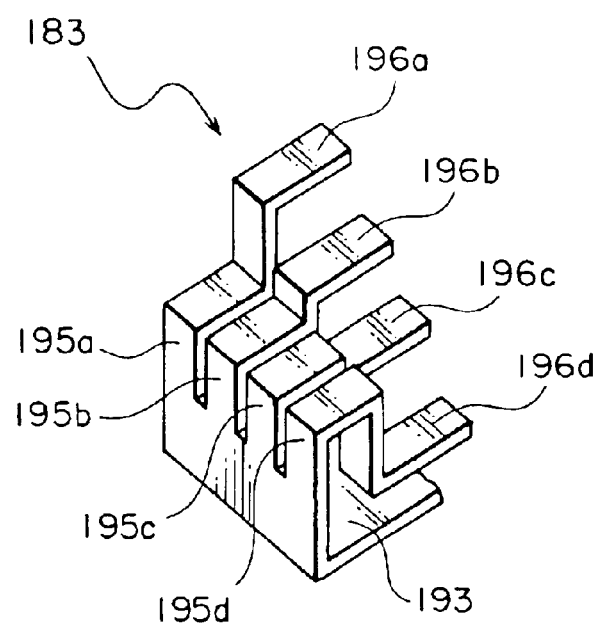
FIG. 22 is a perspective view of an anode terminal included in the chip-type solid electrolytic capacitor of FIG. 21t.

Referring to FIGS. 21 and 22, a chip-type solid electrolytic capacitor according to the ninth embodiment will be described. As shown in FIG. 21, the chip-type solid electrolytic capacitor comprises an anode terminal 183, a cathode terminal 184, and an encapsulating resin 187.

Referring to FIG. 22, the anode terminal 183 has an anode terminal body 193 and first, second, third, and fourth branches 195a, 195b, 195c, and 195d provided with first, second, third, and fourth branch end portions 196a, 196b, 196c, and 196d, respectively.

In the ninth embodiment, a boundary between the anode terminal body 193 extending from a mounting surface to a part of a side surface of a finished product and each of the first, the second, the third, and the fourth branches 195a, 195b, and 195c, and 195d is located on the side surface of the finished product. At end portions of the first, the second, the third, and the fourth branches 195a, 195b, 195c, and 195d, the first, the second, the third, and the fourth branch end portions 196a, 196b, 196c, and 196d are formed by bending to be welded to the anode lead wires, respectively. Except the above, the ninth embodiment is similar to the third embodiment.

Therefore, the ninth embodiment not only achieves the effect similar to that of the third embodiment but also enables reduction in volume occupied by the anode connecting portion like in the seventh embodiment.

Tenth Embodiment

Figure 23:
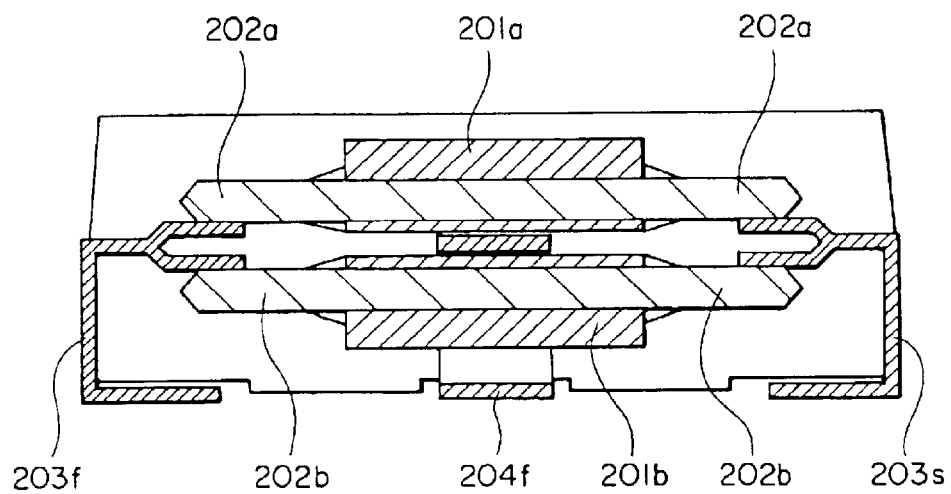
FIG. 23 is a schematic sectional view of a chip-type solid electrolytic capacitor according to a tenth embodiment of the present invention.
Figure 24A:
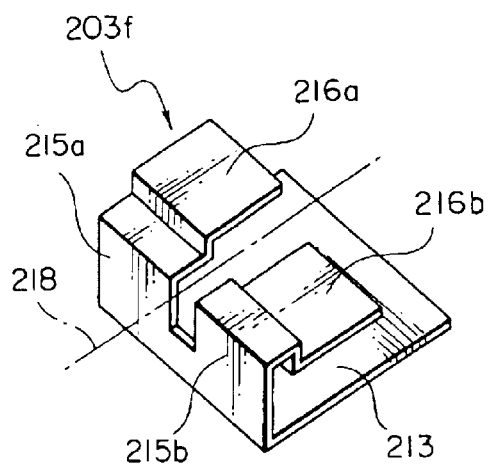
FIG. 24A is a perspective view of an anode terminal included in the chip-type solid electrolytic capacitor of FIG. 23.
Figure 24B:
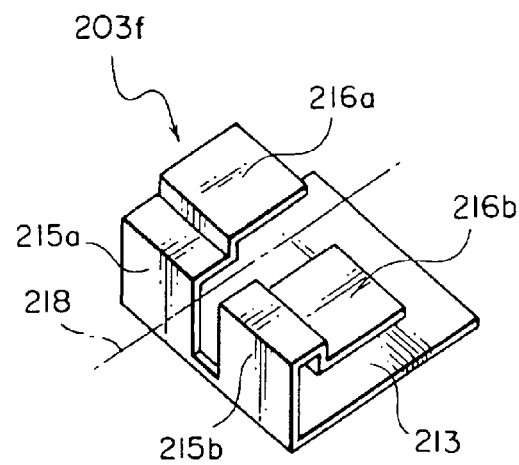
FIG. 24B is a perspective view of a modification of the anode terminal.
Figure 24C:
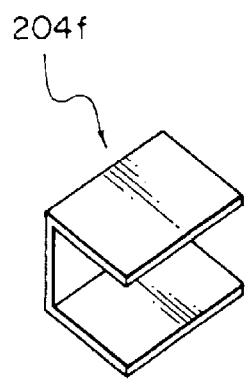
FIG. 24C is a perspective view of a cathode terminal included in the chip-type solid electrolytic capacitor of FIG. 23.
Figure 24D:
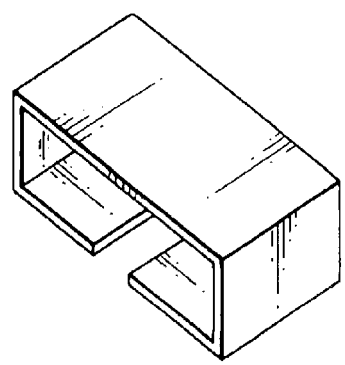
FIG. 24D is a perspective view of a modification of the cathode terminal.
Figure 25A:
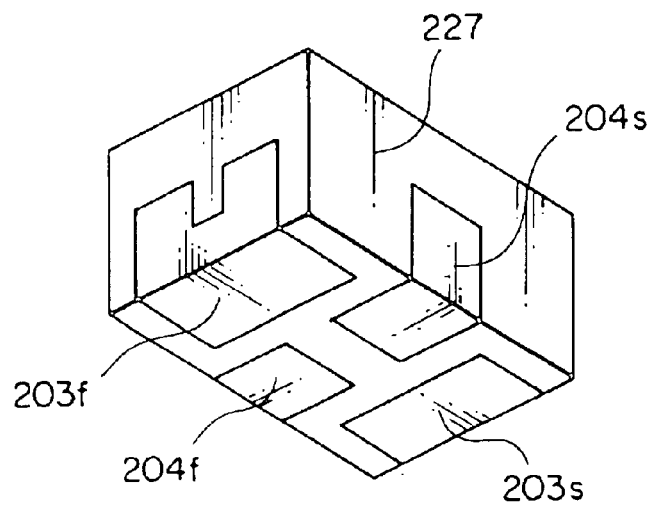
FIG. 25A is a perspective view of a final product the chip-type solid electrolytic capacitor of FIG. 23 in case of the anode terminal of FIG. 24A.
Figure 25B:
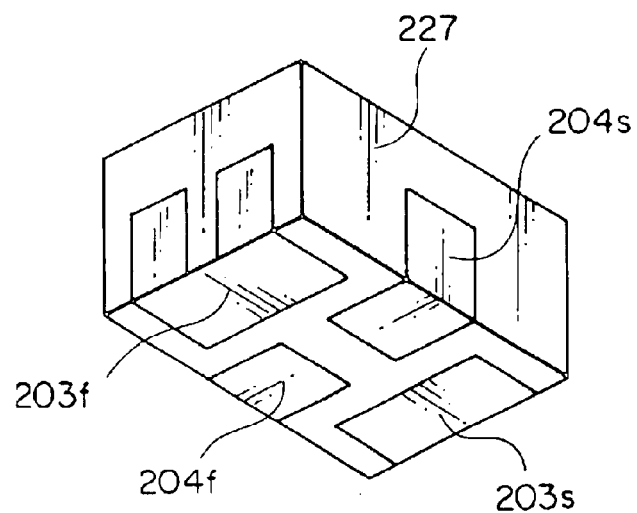
FIG. 25B is a perspective view of a final product the chip-type solid electrolytic capacitor in the tenth embodiment in case of the anode terminal in FIG. 24B.

Referring to FIGS. 23, 24A through 24D, and 25A and 25B, a chip-type solid electrolytic capacitor according to the tenth embodiment will be described. As shown in FIG. 23, the chip-type solid electrolytic capacitor comprises first and second pellet-like capacitor elements 201a and 201b, first and second anode lead wires 202a and 202b, first and second anode terminals 203f and 203s, and first and second cathode terminals 204f and 204s (FIGS. 25A and 25B).

Referring to FIG. 24A, the first anode terminal 203f has an anode terminal body 213, first and second branches 215a and 215b, and first and second branch end portions 216a and 216b. Referring to FIG. 24B, the first anode terminal 203f is modified in that the space between the first and the second branches 215a and 215b is lengthened.

Referring to FIG. 24C, the first cathode terminal 204f has a U shape. Referring to FIG. 24D, the first cathode terminal 204f has a different shape.

Referring to FIGS. 25A and 25B, the chip-type solid electrolytic capacitor in the tenth embodiment as the finished product has external appearances illustrated in the figures in case where the anode terminals in FIGS. 24A and 24B are used, respectively. The first and the second anode terminals 203f and 203s and the first and the second cathode terminals 204f and 204s are partially exposed from an encapsulating resin 227. The first and the second anode terminals 203f and 203f are same in shape. The first and the second cathode terminals 204f and 204s are same in shape.

The chip-type solid electrolytic capacitor in the tenth embodiment is similar to that of the fourth embodiment except the following.

As illustrated in FIG. 24A or 24B, a boundary between the anode terminal body 213 and each of the first and the second branches 215a and 215b is located on the side surface of the finished product. In other words, the first and the second branches are branched from the anode terminal body at a position on the side surface of the finished product, not inside the encapsulating resin. With the above-mentioned structure, welded portions similar to those in the fourth embodiment are formed in which the first and the second branch end portions 216a and 216b are configured so that they overlap each other by rotation of 180° with respect to a straight line 218. Therefore, the tenth embodiment not only achieve the effect similar to that in the fourth embodiment but achieves an anode terminal portion reduced in occupied volume like in the seventh embodiment.

As illustrated in FIG. 23, the first and the second lead wires 202a and 202b extracted from the first and the second capacitor elements 201a and 201b are decentered in the vertical direction. With this structure, the amount of bending the branch end portions of the first and the second anode terminals 203f and 203s is reduced so that the branches of the anode terminals are shortened in length. Thus, the anode terminal has a structure suitable for production.

Instead of the first and the second cathode terminals 204f and 204s, a single integral cathode terminal illustrated in FIG. 24D may be formed.

Eleventh Embodiment

Figure 26:
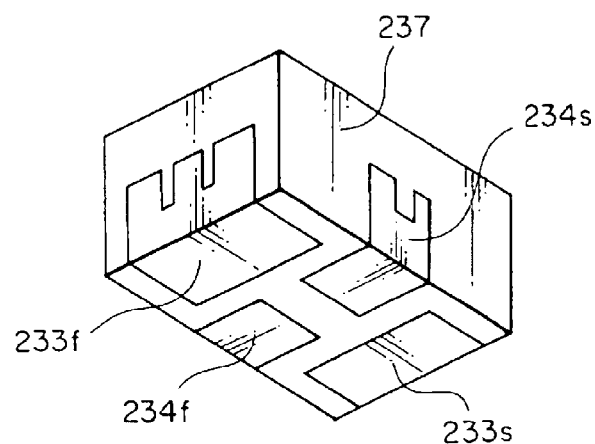
FIG. 26 is a perspective view of a final product of a chip-type solid electrolytic capacitor according to an eleventh embodiment of the present invention.
Figures 27A, 27B:
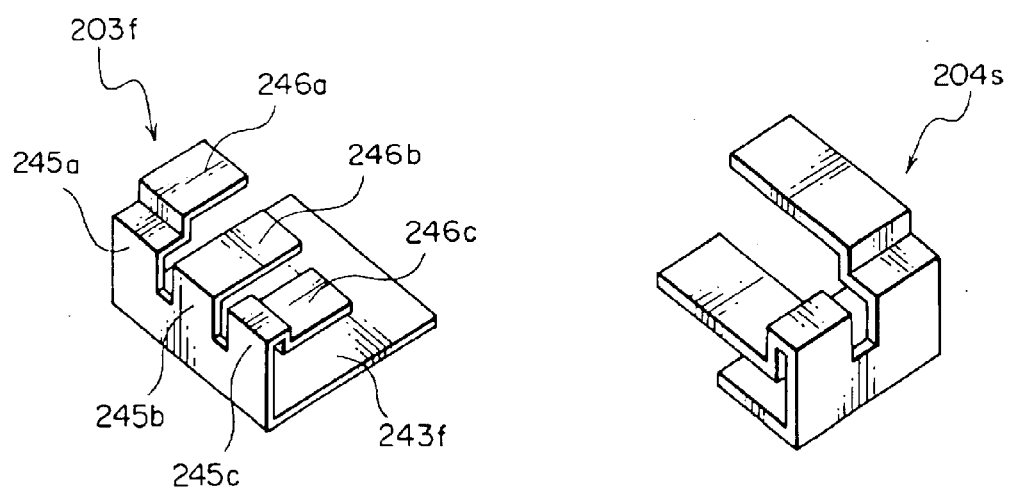
FIG. 27A is a perspective view of an anode terminal included in the chip-type solid electrolytic capacitor of FIG. 26.
FIG. 27B is a perspective view of a cathode terminal included in the chip-type solid electrolytic capacitor of FIG. 26.

Referring to FIG. 26 and FIGS. 27A and 27B, a chip-type solid electrolytic capacitor according to an eleventh embodiment will be described. As shown in FIG. 26, first and second anode terminals 233f and 233s and first and second cathode terminals 234f and 234s are partially exposed from an encapsulating resin 237.

Except that the first anode terminal 203f illustrated in FIG. 27A and the second anode terminal 203s similar in shape to the first anode terminal 203f are used, the chip-type solid electrolytic capacitor is obtained in the manner similar to the fifth embodiment.

As shown in FIG. 27A, the first anode terminal 203f has an anode terminal body 243f and first, second, and third branches 245a, 245b, and 245c. A boundary between the anode terminal body 243f and each of the first, the second, and the third branches 245a, 245b, and 245c is located on a side surface of a finished product. The first branch 245a is provided with a first branch end portion 246a bent upward. The second branch 245b has a part as a second branch end portion 246b. The third branch 245c is provided with a third branch end portion 246c bent downward. Each of the branch end portions is connected to each of the anode lead wires.

Like in the fifth embodiment, the second cathode terminal 204s illustrated in FIG. 27C and the first cathode terminal 204f similar in shape to the second cathode terminal 204s are faced to each other.

Thus, the effect similar to that in the fifth embodiment is maintained and the volume occupied by the anode terminal portion is reduced.

Twelfth Embodiment

Figure 28:
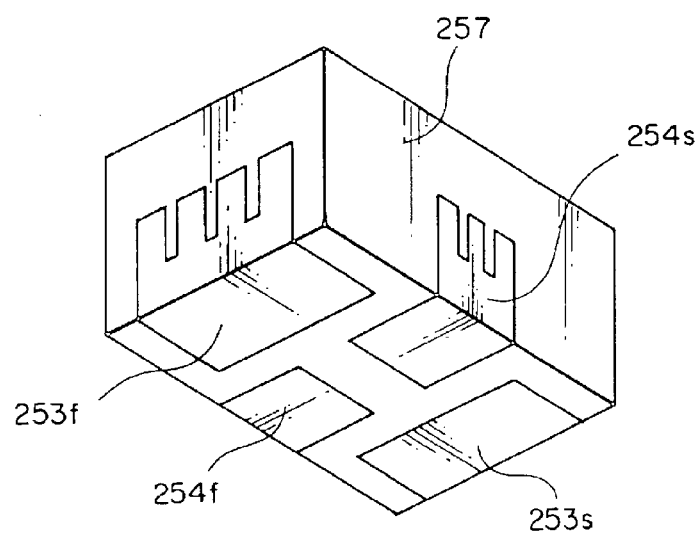
FIG. 28 is a perspective view of a final product of a chip-type solid electrolytic capacitor according to a twelfth embodiment of the present.
Figures 29A, 29B:
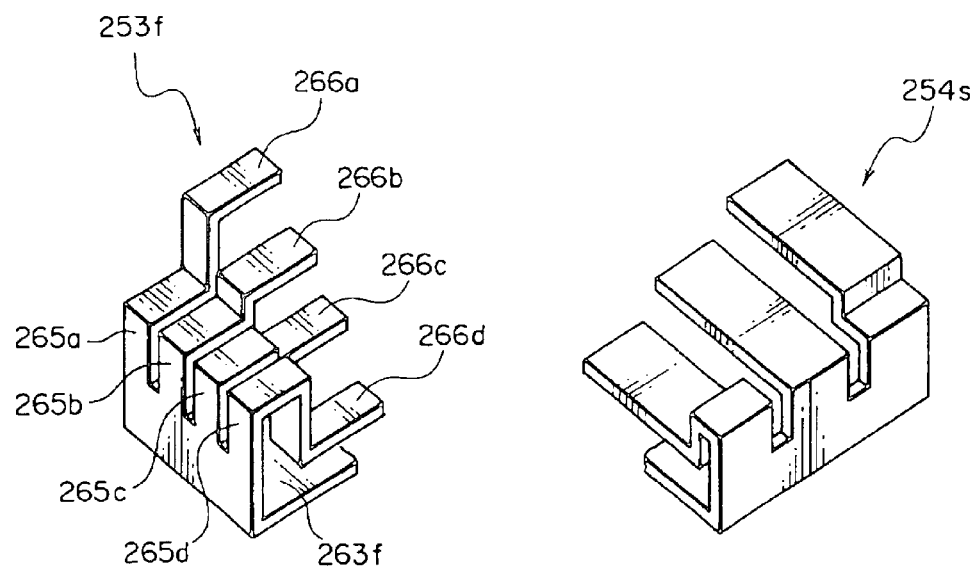
FIG. 29A is a perspective view of an anode terminal included in the chip-type solid electrolytic capacitor of FIG. 28.
FIG. 29B is a perspective view of a cathode terminal included in the chip-type solid electrolytic capacitor of FIG. 28.

Referring to FIG. 28 and FIGS. 29A and 29B, a chip-type solid electrolytic capacitor according to the twelfth embodiment will be described. As shown in FIG. 28, the chip-type solid electrolytic capacitor has first and second anode terminals 253f and 253s and first and second cathode terminals 254f and 254s.

Except that the first anode terminal 253f shown in FIG. 29A and the second anode terminal 253s similar in shape to the first anode terminal 253f are used, the chip-type solid electrolytic capacitor is produced in the manner similar to the sixth embodiment.

Referring to FIG. 29A, a boundary between an anode body 263f and each of first, second, third, and fourth branches 265a, 265b, 265c, and 265d is located on a side surface of a finished product. The first branch 265a is provided with a first branch end portion 266a bent upward. The second branch 265b is provided with a second branch end portion 266b bent upward. The third branch 265c is provided with a third branch end portion 266c bent downward. The fourth branch 265d is provided with a fourth branch end portion 266d bent downward. Each of he branch end portions is connected to each of the anode lead wires.

Like in the sixth embodiment, the second cathode terminal 254s illustrated in FIG. 29B and the first cathode terminal 254f similar in shape to the second cathode terminal 254s are used.

Thus, the effect similar to that in the sixth embodiment is maintained and the volume occupied by the anode terminal portion is reduced.

In each of the chip-type solid electrolytic capacitor according to the seventh through the twelfth embodiments, the volume occupied by the anode terminal portion is reduced so as to increase the volumetric ratio of the capacitor elements contributing to the capacitance with respect to the total volume of the finished product. In other words, the volumetric efficiency is increased. In addition, around the welded portions, the anode connecting structure similar to those in the first through the sixth embodiments is used so that the anode connecting structure high in reliability is achieved.

In each of the foregoing embodiments, the end portion of the anode terminal portion to be welded to the anode lead wires is separated into a plurality of branches, keeping a highly symmetrical structure. Therefore, it is possible to prevent interference between welding nuggets upon welding, such as resistance welding or laser welding, so that the welded portion is suppressed in variation. Because of the highly symmetrical structure, the number of steps in the production process can easily be reduced.

The chip-type solid electrolytic capacitor mentioned above is therefore small in size, thin in profile, low in ESR, and high in capacitance. In the chip-type solid electrolytic capacitor, the anode connecting portion has a highly symmetrical structure without interference between welded portions. As a result, variation in electric characteristic is suppressed among the capacitor elements. In addition, the chip-type solid electrolytic capacitor is excellent in reliability of connection.

Although the present invention has been shown and described in conjunction with the several preferred embodiments thereof, it will readily be understood by those skilled in the art that the present invention is not limited to the foregoing description but may be changed and modified in various other manners without departing from the spirit and scope of the present invention as set forth in the appended claims.

What is claimed is:

1. A chip-type solid electrolytic capacitor having a mounting surface and comprising:
   a pair of capacitor elements laminated in a predetermined direction perpendicular to the mounting surface, each of the capacitor elements using a valve metal and having an anode member and a cathode layer mechanically coupled to the anode member;
   a pair of anode lead wires each of which is led out from the anode member in parallel to the mounting surface;
   an anode terminal connected to the anode lead wires;
   a cathode terminal connected to the cathode layer; and
   an encapsulating resin encapsulating the capacitor elements with the anode and the cathode terminals partially exposed, the anode terminal including two branches having branch end portions, respectively, which are formed by shaping, the branch end portions having shapes substantially same to each other so that the branch end portions overlap each other by rotation of 180° around a straight line at an intermediate position between the anode lead wires, the branch end portions being welded to the anode lead wires to produce welded portions, respectively.

2. The chip-type solid electrolytic capacitor according to claim 1, wherein the anode terminal further includes a body portion, the branches being connected to the body portion and branched at a position which is on an intermediate plane located at a substantial center between the anode leads.

3. The chip-type solid electrolytic capacitor according to claim 1, wherein the anode terminal further includes a body portion, the branches being connected to the body portion and branched at a position which is on a side surface of the chip-type solid electrolytic capacitor.

4. The chip-type solid electrolytic capacitor according to claim 1, wherein one of the branch end portions is bent in a direction away from the mounting surface while another of the branch end portions is bent in a direction towards the mounting surface.

5. The chip-type solid electrolytic capacitor according to claim 1, wherein each of the branched end portions has a first and a second surface which are opposite to each other in the predetermined direction, one of the welded portions being formed on the first surface of one of the branch end portions, another of the welded portions being on the second surface of another of the branch end portions.

6. A chip-type solid electrolytic capacitor having a mounting surface and comprising:
   three capacitor elements laminated in a predetermined direction perpendicular to the mounting surface, each of the capacitor elements using a valve metal and having an anode member and a cathode layer mechanically coupled to the anode member;
   three anode lead wires each of which is led out from the anode member in parallel to the mounding surface;
   an anode terminal connected to the anode lead wires;
   a cathode terminal connected to the cathode layer; and
   an encapsulating resin encapsulating the capacitor elements with the anode and the cathode terminals partially exposed, the anode terminal including three branches having a first, a second, and a third branch end portion, respectively, which are formed by shaping, the first and the third branch end portions having shapes so as to overlap each other by rotation of 180° around a straight line, the second branch end portion being between the first and the third branch end portions, the first, the second, and the third branch end portions being welded to the anode lead wires to produce welded portions, respectively.

7. The chip-type solid electrolytic capacitor according to claim 6, wherein the anode terminal further includes a body portion, the branches being connected to the body portion and branched at an inside of the encapsulating resin.

8. The chip-type solid electrolytic capacitor according to claim 6, wherein the anode terminal further includes a body portion, the branches being connected to the body portion and branched at a position which is on a side surface of the chip-type solid electrolytic capacitor.

9. The chip-type solid electrolytic capacitor according to claim 6, wherein the first branch end portion is bent in a direction away from the mounting surface while the third branch end portion is bent in a direction towards the mounting surface.

10. The chip-type solid electrolytic capacitor according to claim 6, wherein the cathode terminal has two branches connected to the cathode layer between adjacent ones of the capacitor elements.

11. A chip-type solid electrolytic capacitor having a mounting surface and comprising:

four capacitor elements laminated in a predetermined direction perpendicular to the mounting surface, each of the capacitor elements using a valve metal and having an anode member and a cathode layer mechanically coupled to the anode member;

four anode lead wires each of which is led out from the anode member in parallel to the mounting surface;

an anode terminal connected to the anode lead wires;

a cathode terminal connected to the cathode layer; and an encapsulating resin encapsulating the capacitor elements with the anode and the cathode terminals partially exposed, the anode terminal including four branches having a first, a second, a third, and a fourth branch end portion, respectively, which are formed by shaping, the first and the fourth branch end portions having shapes so as to overlap each other by rotation of 180° around a straight line, the second and the third branch end portions being between the first and the fourth branch end portions and having shapes so as to overlap each other by rotation of 180° around the straight line, the first, the second, the third, and the fourth branch end portions being welded to the anode lead wires to produce welded portions, respectively.

12. The chip-type solid electrolytic capacitor according to claim 11, wherein the anode terminal further includes a body portion, the branches being connected to the body portion and branched at a position which is on an intermediate plane between second and third ones of the anode wires counted from the mounting surface.

13. The chip-type solid electrolytic capacitor according to claim 11, wherein the anode terminal further includes a body portion, the branches being connected to the body portion and branched at a position which is on a side surface of the chip-type solid electrolytic capacitor.

14. The chip-type solid electrolytic capacitor according to claim 11, wherein the first and the second branch end portions are bent in a direction away from the mounting surface while the third and the fourth branch end portions are bent in a direction towards the mounting surface.

15. The chip-type solid electrolytic capacitor according to claim 11, wherein the cathode terminal has three branches connected to the cathode layer between adjacent ones of the capacitor elements.

16. A method of producing a chip-type solid electrolytic capacitor having a mounding surface and comprising a plurality of capacitor elements which are laminated in a direction perpendicular to the mounting surface and electrically connected in parallel, each of the capacitor elements having an anode member using a valve metal, an anode lead wire led out from the anode member, and a cathode layer mechanically coupled to the anode member, the method comprising the steps of:

preparing a lead frame having an anode terminal forming portion and a cathode terminal forming portion, the anode terminal having a center line and a plurality of branches symmetrical with each other with respect to the center line;

shaping the branches by bending;

welding the capacitor elements to the anode terminal forming portion and connecting the cathode layer to the cathode terminal forming portion;

molding the capacitor elements, connected to the lead frame, by an encapsulating resin to obtain a molded body; and cutting the lead frame to separate a part of the lead frame from the molded body.

17. A chip-type solid electrolytic capacitor having a mounting surface and comprising:

a capacitor portion having a plurality of capacitor elements laminated in a predetermined direction perpendicular to the mounting surface, each of the capacitor elements using a valve metal;

a cathode terminal led out from the capacitor portion;

a plurality of anode lead wires led out from the capacitor portion in parallel to the mounting surface, the anode lead wires being positioned apart from each other in the predetermined direction;

an anode terminal connected to the anode lead wires; and an encapsulating resin encapsulating the capacitor portion with the anode and the cathode terminals partially exposed, the anode terminal including a plurality of branch end portions which are positioned apart from each other in the predetermined direction and welded to the anode lead wires, respectively.

18. The chip-type solid electrolytic capacitor according to claim 17, wherein the capacitor portion has a plurality of cathode layers parallel to the mounting surface, the cathode layers being positioned apart from each other in the predetermined direction, the cathode terminal including a plurality of branch end portions which are positioned apart from each other in the predetermined direction and connected to the cathode layers, respectively.

* * * * *